(12) United States Patent
Garg et al.

(10) Patent No.: US 12,353,436 B1
(45) Date of Patent: Jul. 8, 2025

(54) RULES DRIVEN APPLICATION SYNCHRONIZATION BY AUTOMATICALLY DETECTING DIFFERENT TEMPLATE NODES FOR DIFFERENT SYNCHRONIZATION TARGETS

(71) Applicant: Oracle International Corporation, Redwood Shores, CA (US)

(72) Inventors: Anurag Garg, Cupertino, CA (US); Matthew Lawrence Lontchar, Avon Lake, OH (US); James McCausland, Addison, TX (US); Douglas Ray Cosby, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/732,417

(22) Filed: Jun. 3, 2024

(51) Int. Cl.
*G06F 16/27* (2019.01)

(52) U.S. Cl.
CPC ............................ *G06F 16/27* (2019.01)

(58) Field of Classification Search
CPC ........................................... G06F 16/27
See application file for complete search history.

(56) References Cited

U.S. PATENT DOCUMENTS

| | | | | |
|---|---|---|---|---|
| 9,430,114 | B1* | 8/2016 | Dingman | G06F 16/25 707/737 |
| 2009/0327343 | A1* | 12/2009 | McCormack | G06F 16/258 707/999.107 |
| 2020/0042533 | A1* | 2/2020 | Lee | G06F 16/2228 707/737 |
| 2021/0056097 | A1* | 2/2021 | Banister | G06F 16/213 707/737 |
| 2024/0119043 | A1* | 4/2024 | Panesar | G06F 16/2379 707/737 |
| 2024/0184989 | A1* | 6/2024 | Mann | G06F 40/166 707/737 |

* cited by examiner

*Primary Examiner* — Yuk Ting Choi
(74) *Attorney, Agent, or Firm* — MUGHAL GAUDRY & FRANKLIN PC

(57) ABSTRACT

A data management system receives updates to records of a source dimension. Some records of the source dimension reference target dimensions. The data management system identifies template records from existing records in the source dimension for modeling changes to connections with the target dimensions based on the updated records in the source dimension. The template records are discovered using rules-driven processes, AI-driven processes, or a serial or parallel hybrid processes including rules and AI. These processes use ancestor information from the updated records to find best-matching template records. The rules-driven processes additionally rely on matching fields, and the AI-driven processes additionally rely on vector embeddings and optionally clustering. Updates are made to the target records in the target dimensions, including any roll-up structures indicated for data propagation, identified using the template records, and downstream applications using the target records may consume the updates.

20 Claims, 12 Drawing Sheets

Start

↓

Receiving update(s) to record(s) of a source dimension, where at least some record(s) of the source dimension reference a target dimension
102C

↓

For each first record of the updated record(s), identifying candidate connection(s) from the first record to the target dimension
104C Access a first user-specified setting that activates automated identification of a candidate connection for connecting the source dimension to the target dimension
108C

↓

Generate a first vector embedding of value(s) of the first record
112C

↓

Determine a first distance between the first vector embedding and a second vector embedding of second record(s) of the source dimension
118C Determine a second distance between the first vector embedding and a third vector embedding of third record(s) of the source dimension
120C

↓

Based at least in part on the first distance and the second distance, identify fourth record(s) in the first target dimension using key value(s) from the second record(s) or the third record(s)
122C

↓

Update the fourth record(s) to reference the first record using a key value of the first record
128C Update the first record to reference the fourth record(s) using key values of the fourth record(s)
132C

↓

Receive request from first application for information from fourth record(s) and provide information about first record
134C Receive request from another application for information from first record(s) and provide information about fourth record(s)
138C

↓

End

RULES DRIVEN APPLICATION SYNCHRONIZATION BY AUTOMATICALLY DETECTING DIFFERENT TEMPLATE NODES FOR DIFFERENT SYNCHRONIZATION TARGETS

BACKGROUND

Master data management tools such as dimensional cube management tools help maintain data across different applications. Organizations use a variety of applications to accomplish a variety of domain-specific functions. Even for the same domain, different parts of an organization may use different applications to store and manage data, due to individual preferences, pre-existing commitments, unique features, compliance with regional standards or laws, or for a variety of other reasons. As an organization evolves, some applications may persist to manage functionality for parts of the organization while other applications are newly adopted to manage functionality for other parts of the organization. Even if all members of an organization moved to the same suite of applications, such a condition is likely to be temporary as the organization onboards new employees, engages with new partners, and experiences new challenges that prompt new solutions.

Many applications manage data using data structures and hierarchies unique to the applications. For example, a construction and engineering application may manage projects using data structures that focus on properties and projects, with the people, supplies, labor, permits, and construction timelines surrounding the properties and projects. As another example, a human capital management application may manage contacts using data structures that focus on communication, reachability, and compensation information for the contacts, with projects, work facilities, contracts, and job training data surrounding the contacts.

In the examples, if the same organization uses a construction and engineering application and a human capital management application, there may be little, if any, overlap between the data hierarchies managed by one application and the data hierarchies managed by the other application. Even if the data hierarchies are different, data from the human capital management application may be useful for ensuring that all projects are managed by active employees of the company and determining which active employees are currently managing which projects. Similarly, data from the construction and engineering application may be useful for the human capital management application for determining which projects have been completed by which employees of the company and recommending salary adjustments and bonuses based on project performance.

Manual data synchronization between data hierarchies is cumbersome, particularly when each application is managing hundreds, thousands, or more records that are used by other applications. If these records change daily, weekly, or monthly, checking that data is up-to-date and performing additional updates may be an endless task that cannot be completed by humans regardless of the size of the work force. Even using machines, synchronizing data between ever-changing data hierarchies may result in poor alignment between the hierarchies and data divergence from inconsistent data mapping. Establishing data mappings between hierarchies may involve a significant amount of manual labor from subject matter experts and may not be effective for all records being updated at all times, at which point the manual labor may be repeated over and over again.

The problems above are compounded as more applications provide updates, as data hierarchies change more quickly over time, and as more applications rely on the updates. Aside from the long-term problems, data can become instantly misaligned due to a transformational event for the organization, such as a merger or acquisition. Regardless of the source of the problem, data mappings from application to application may be out-of-date or otherwise misaligned for at least one application of the organization, and even just one misalignment can cause data divergence among all applications that rely on the misaligned data. This results in poor decision-making, inaccurate predictions, and even defects in work products.

BRIEF SUMMARY

In some embodiments, a data management system receives updates to records of a source dimension. Some records of the source dimension reference target dimensions. The data management system identifies template records from existing records in the source dimension for modeling changes to connections with the target dimensions based on the updated records in the source dimension. The template records are discovered using rules-driven processes, AI-driven processes, or a serial or parallel hybrid processes including rules and AI. These processes use ancestor information from the updated records to find best-matching template records. The rules-driven processes additionally rely on matching fields, and the AI-driven processes additionally rely on vector embeddings and optionally clustering. Updates are made to the target records in the target dimensions, including any roll-up structures indicated for data propagation, identified using the template records, and downstream applications using the target records may consume the updates.

In one embodiment, a computer-implemented method includes receiving one or more updates to one or more records of a first set of data stored in one or more first database structures. One or more other records of the first set of data reference one or more key values of a second set of data stored in one or more second database structures and one or more key values of a third set of data stored in one or more third database structures. For at least a first record, of the one or more records, identifiable in the first set of data using a first key value, the computer-implemented method identifies candidate connections from the first record to the second set of data and the third set of data. Identifying the candidate connections is performed at least in part by accessing a first user-specified rule for connecting the first set of data to the second set of data. The first user-specified rule comprises one or more matching fields of the first set of data. Identifying the candidate connections is further performed at least in part by identifying a second record in the first set of data that satisfies an ancestor condition at least in part by sharing a common ancestor with the first record, and matches the first record on the one or more matching fields. The second record references a second key value of the second set of data. Identifying the candidate connections is further performed at least in part by accessing a second user-specified rule for connecting the first set of data to the third set of data. The second user-specified rule specifies one or more other matching fields of the first set of data. Identifying the candidate connections is further performed at least in part by identifying a third record in the first set of data that satisfies an ancestor condition at least in part by sharing a common ancestor with the first record, and matches the first record on the one or more other matching fields. The third record references a third key value of the third set of data. Identifying the candidate connections is further performed at least in part by identifying, for use as a first candidate connection from the first record to the second set of data, a fourth record in the second set of data using the second key value. Identifying the candidate connections is further performed at least in part by identifying, for use as a second candidate connection from the first record to the third set of data, a fifth record in the third set of data using the third key value. The computer-implemented method further includes updating the fourth record to reference the first record using the first key value, updating the fifth record to reference the first record using the first key value, and updating the first record in the first set of data to reference the fourth record using the second key value and the fifth record using the third key value. In a particular embodiment, the computer-implemented method receives a request from an application for information from the fourth record, and, in response to the request, provides information about the first record.

In a further embodiment, the one or more matching fields are one or more required matching fields, and the one or more other matching fields are one or more other required matching fields. The first user-specified rule also specifies one or more preferred fields, and the second user-specified rule also specifies one or more other preferred fields. In this embodiment, identifying the second record further comprises assigning a first score to the second record based at least in part on whether the second record matches the one or more preferred fields, and selecting the second record from among a plurality of records of the first set of data based at least in part on the first score. In this embodiment, identifying the third record further comprises assigning a second score to the third record based at least in part on whether the third record matches the one or more other preferred fields, and selecting the third record from among a plurality of records of the first set of data based at least in part on the second score.

In the same or a different further embodiment, the first user-specified rule indicates that updates are to be automatically applied and the second user-specified rule indicates that updates are to be reviewed before being applied. Updating the fourth record and updating the first record are performed automatically in response to identifying the fourth record for use as the first candidate connection from the first record to the second set of data, without prompting a user for confirmation before updating the fourth record and updating the first record.

In another embodiment, the one or more updates are received from a first user, and the first user-specified rule indicates that updates are to be reviewed before being applied and the second user-specified rule indicates that updates are to be automatically applied. In this embodiment, updating the fourth record and updating the first record are performed after notifying a second user, according to the first user-specified rule, that the fourth record is proposed for use as the first candidate connection from the first record to the second set of data. In this embodiment, updating the fourth record and updating the first record are performed in response to receiving user input from the second user confirming the fourth record is to be used as the first candidate connection from the first record to the second set of data.

In another embodiment, the one or more updates are received from a first user, and the first user-specified rule indicates that updates are to be reviewed by a second user before being applied and the second user-specified rule indicates that updates are to be reviewed by a third user before being applied. In this embodiment, updating the fourth record and updating the first record are performed after notifying the second user, according to the first user-specified rule, that the fourth record is proposed for use as the first candidate connection from the first record to the second set of data. In this embodiment, updating the fourth record and updating the first record are performed in response to receiving user input from the second user confirming the fourth record is to be used as the first candidate connection from the first record to the second set of data. Further, in this embodiment, updating the fifth record is performed after notifying the third user, according to the second user-specified rule, that the fifth record is proposed for use as the second candidate connection from the first record to the third set of data. Also in this embodiment, updating the fifth record is performed in response to receiving user input from the third user confirming the fifth record is to be used as the second candidate connection from the first record to the third set of data.

In the same or a different further embodiment, for at least a sixth record of the one or more records in the first set of data, the computer-implemented method includes accessing a third user-specified rule for connecting the first set of data to a fourth set of data. The third user-specified rule specifies one or more third matching fields of the first set of data. The computer-implemented method further includes searching for a record in the first set of data that satisfies an ancestor condition at least in part by sharing a common ancestor with the sixth record, and matches the sixth record on the one or more third matching fields. In response to failing to identify a record in the first set of data that satisfies an ancestor condition at least in part by sharing a common ancestor with the sixth record and that matches the sixth record on the one or more third matching fields, the computer-implemented method causes display of a notification that no matching record was found to connect the sixth record to the fourth set of data. The notification comprises an option to select a template record or to select a value for connecting the sixth record to the fourth set of data without selecting the template record.

In the same or a different further embodiment, the computer-implemented method further includes causing display of a user interface for configuring the first user-specified rule, and recommending, via an option on the user interface, a particular one or more fields to use as the one or more matching fields from the first set of data based at least in part on a similarity between a first range of the particular one or more fields and a second range of one or more fields in the second set of data.

In the same or a different further embodiment, the computer-implemented method further includes causing display of a user interface for configuring the first user-specified rule, and recommending, via an option on the user interface, a particular one or more fields to use as the one or more matching fields from the first set of data based at least in part on a likelihood that existing records of the first set of data already connected to a same record of the second set of data already match on the particular one or more fields.

In the same or a different further embodiment, the computer-implemented method further includes causing display of a user interface for configuring the first user-specified rule, and causing display, in the user interface, of a plurality of fields that may be used as the one or more matching fields from the first set of data. The plurality of fields exclude one or more fields that have been blacklisted in a user-specified blacklist of fields that are not to be used as matching fields at least for matching to the second set of data.

In the same or a different further embodiment, the second record references a fourth key value of a roll-up structure of the second set of data. The computer-implemented method further includes identifying, for use as a third candidate connection from the first record to the second set of data, a sixth record in the second set of data using the fourth key value, and updating the sixth record to reference the first record using the first key value. In this embodiment, updating the first record comprises updating the first record to reference the fourth key value.

In another embodiment, a computer-implemented method includes receiving one or more updates to one or more records of a first set of data stored in one or more first database structures, wherein one or more other records of the first set of data reference one or more key values of a second set of data stored in one or more second database structures. For at least a first record, of the one or more records, identifiable in the first set of data using a first key value, the computer-implemented method further includes connecting the first record to the second set of data. Connecting the first record to the second set of data is performed at least in part by accessing a first user-specified setting that activates automated identification of a candidate connection for connecting the first set of data to the second set of data. Based at least in part on the first user-specified setting, the computer-implemented method further includes generating a first vector embedding of one or more values of the first record, and determining a first distance between the first vector embedding and a second vector embedding of one or more values of a second record of the first set of data. The second record shares a common ancestor with the first record, and the second record references a second key value of the second set of data. The computer-implemented method further includes determining a second distance between the first vector embedding and a third vector embedding of one or more values of a third record of the first set of data. The third record shares a common ancestor with the first record, and the third record references a third key value of the second set of data. Based at least in part on the first distance and the second distance and based at least in part on the common ancestor with the first record, the computer-implemented method identifies, for use as a particular candidate connection from the first record to the second set of data, a fourth record in the second set of data using the second key value. The computer-implemented method further includes updating the fourth record to reference the first record using the first key value, and updating the first record in the first set of data to reference the fourth record using the second key value. In a particular embodiment, the computer-implemented method further includes receiving a request from an application for information from the fourth record, and, in response to the request, providing information about the first record.

In a further embodiment, the first user-specified setting comprises one or more preferred matching fields, and identifying the fourth record for use as the particular candidate connection is further based at least in part on an increased weight of the one or more preferred matching fields.

In the same or a different further embodiment, the first user-specified setting indicates a preferred common ancestry, and identifying the fourth record for use as the particular candidate connection is further based at least in part on an increased weight of a subset of records sharing the preferred common ancestry. The subset of records comprises the second record and the third record.

In the same or a different further embodiment, the second vector embedding of one or more values of a second record of the first set of data comprises an aggregate vector embedding of a particular cluster of vector embeddings corresponding to a subset of records of the first set of data. In this embodiment, the computer-implemented method further includes determining the aggregate vector embedding at least in part by clustering vector embeddings of records in the first set of data into a plurality of clusters including the particular cluster. The clustering is based at least in part on connections between records represented by the vector embeddings and records of the second set of data. Determining the aggregate vector embedding is further performed at least in part by aggregating vector embeddings of the particular cluster.

In the same or a different further embodiment, the first user-specified setting comprises one or more required matching fields, and the computer-implemented method further includes filtering, from the first set of data, records that do match on the one or more required matching fields. The first distance and the second distance are determined based at least in part on the first record and the second record remaining after the filtering.

In the same or a different further embodiment, the first user-specified setting is subject to a blacklist of fields, and the computer-implemented method further includes filtering, from the first set of data, one or more particular fields on the blacklist of fields. The first vector embedding is generated based on fields other than the one or more particular fields after the filtering. The computer-implemented method further includes generating the second vector embedding and the third vector embedding based on fields other than the one or more particular fields after the filtering.

In the same or a different further embodiment, the first user-specified setting is subject to an option to exclude fields that have a protected class of information, and the computer-implemented method further includes filtering, from the first set of data, one or more particular fields predicted to have a protected class of information. The first vector embedding is generated based on fields other than the one or more particular fields after the filtering. The computer-implemented method further includes generating the second vector embedding and the third vector embedding based on fields other than the one or more particular fields after the filtering.

In the same or a different further embodiment, the computer-implemented method further includes accessing a first user-specified rule for connecting the first set of data to the second set of data. The first user-specified rule specifies one or more matching fields of the first set of data. The computer-implemented method further includes determining a first accuracy score for the first user-specified rule and a second accuracy score for the first user-specified setting. The computer-implemented method identifies a fifth record in the first set of data that satisfies an ancestor condition at least in part by sharing a common ancestor with the first record, and matches the first record on the one or more matching fields. The fifth record references a third key value of a sixth record of the second set of data. Based on the first accuracy score and the second accuracy score, the computer-implemented method selects the fourth record instead of the sixth record for use as the particular candidate connection from the first record to the second set of data. In the same or a different further embodiment, the computer-implemented method includes causing display of information about the sixth record of the second set of data in association with a recommendation to connect the first record to the fourth record instead of the fifth record.

In the same or a different embodiment, the second record references a fourth key value of a roll-up structure of the second set of data. The computer-implemented method further includes, based at least in part on the first distance and the second distance and based at least in part on the common ancestor with the first record, identifying, for use as another particular candidate connection from the first record to the second set of data, a fifth record in the second set of data using the fourth key value. The computer-implemented method further includes updating the fifth record to reference the first record using the first key value. In this embodiment, updating the first record comprises updating the first record to reference the fourth key value.

In the same or a different further embodiment, the first user-specified setting indicates that updates are to be automatically applied to connect the first set of data to the second set of data, and another user-specified setting indicates that updates are to be reviewed before being applied to connect the first set of data to another set of data. In this embodiment, updating the fourth record and updating the first record are performed automatically in response to identifying the fourth record for use as the particular candidate connection from the first record to the second set of data, without prompting a user for confirmation before updating the fourth record and updating the first record.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 1C illustrates a flow chart of an example AI-driven process that identifies template record(s) from existing records in a source dimension for modeling change(s) to connection(s) with target dimension(s) based on updated record(s) in the source dimension.

DETAILED DESCRIPTION

Figure 1A:
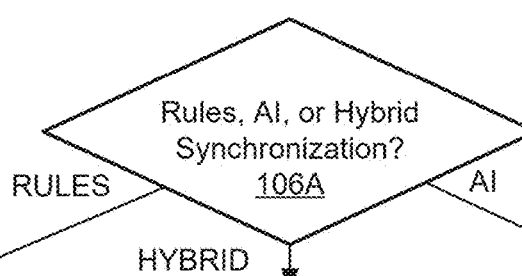
FIG. 1A illustrates a flow chart of an example process to select a rules-driven process, an AI-driven process, or a hybrid process that identifies template record(s) from existing records in a source dimension for modeling change(s) to connection(s) with target dimension(s) based on updated record(s) in the source dimension.

A data management system receives updates to records of a source dimension. Some records of the source dimension reference target dimensions. The data management system identifies template records from existing records in the source dimension for modeling changes to connections with the target dimensions based on the updated records in the source dimension. The template records are discovered using rules-driven processes, AI-driven processes, or hybrid processes, which use ancestor information from the updated records to find best-matching template records. Updates are made to the target records in the target dimensions identified using the template records, and downstream applications using the target records may consume the updates. In various embodiments, identifying template record(s) from existing records for modeling change(s) to connection(s) with target dimension(s) is implemented using non-transitory computer-readable storage media to store instructions which, when executed by one or more processors of a computer system, cause data to be ingested and synchronized across different dimensions. The data ingestion and synchronization may be implemented on a local or cloud-based computer system that includes processors and communicates with a display on a client device for showing the user interface to a user for configuration application synchronization settings.

A description of identifying template record(s) from existing records for modeling change(s) to connection(s) with target dimension(s) is provided in the following sections:
INTELLIGENT APPLICATION SYNCHRONIZATION
DATA HIERARCHIES
RULES-DRIVEN SYNCHRONIZATION
INTELLIGENTLY SELECTED FIELDS AND RULES
AI-DRIVEN SYNCHRONIZATION
HYBRID SYNCHRONIZATION
COMPUTER SYSTEM ARCHITECTURE The steps described in individual sections may be started or completed in any order that supplies the information used as the steps are carried out. The functionality in separate sections may be started or completed in any order that supplies the information used as the functionality is carried out. The terms "first," "second," "third," "fourth," "fifth," and "sixth" are used herein as naming conventions to distinguish different items of a set of items, and these terms do not imply any ordering is required of the items in the set unless such ordering is clearly required by the claims, for example, using terms such as "before" or "after." Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Intelligent Application Synchronization

A data management system may receive and synchronize data across different dimensions for access by different applications that use different data hierarchies. Techniques described herein involve identifying and using template records to guide the application synchronization process. A template record is a record for which a mapping between the record to another set of data may be applied to another record. For example, the template record may have one or more location values, and the template record may be mapped to a specific record, such as "West" region, in a location dimension. The template record may be used to map other similar records also to the "West" region. Template records are discovered using rules-driven processes, AI-driven processes, or a serial or parallel hybrid processes including rules and AI.

When managing master data, each application in an organization's ecosystem might have a slightly different representation of a particular entity. The applications might use slightly different names as well as different levels of specificity (larger regions or smaller regions, for example). These values in the different data structures may also roll up to other records of varying specificity according to a rollup structure, and these rollup structures are likely to be different due to different reporting requirements in different applications. When synchronizing applications, data from one dimension is typically mapped to data in another dimension with manual hard mappings specified by subject matter experts of the data domains. If the hard mappings change or as new data is added, the hard mappings may become stale and misaligned between the different data hierarchies. Techniques described herein provide an automated or semi-automated process for determining how one set of data is connected to another set of data without relying on the hard mappings to be specified by subject matter experts, and without causing the errors, delays, and inefficiencies of manual data mappings. The data management system establishes the connection in a different way than a human expert, using a different process, but the data management system may still provide accurate data mappings that evolve over time as the data set evolves.

Roll-up structures are structures for which aggregate values of members in the dimension are determined. As data from a first dimension is changed, roll-up structures computed or otherwise determined based on or using the changed data may be updated in the first dimension. These changes may also prompt changes to roll-up structures in other dimensions, and the roll-up structures may not be mapped directly to each other. In these scenarios, the data management system might not be able to propagate the changes using hard mappings without significant manual effort. As described herein, the data management system may, instead of relying on hard mappings, rely on an automatically determined template node to determine to what dimensions and roll-up structures within those dimensions the changed data needs to be propagated.

Techniques described herein make use of common ancestry information to find template nodes that are already connected between different hierarchies, and the template nodes are used to find connections between the different data hierarchies. When a node is created, the node may be created in a same location in the hierarchy as similar nodes, and the location in the hierarchy may be used to help find a template node for establishing the connection with another hierarchy. A rules-driven process may use matching field(s) to match a new or changed node, potentially including automatically determined roll-up value(s) based on changed field(s) in the node, to an existing node in a same region of the hierarchy (i.e., with a common ancestor), and the existing node may be used as a template node to establish a connection with another hierarchy. An AI-driven process may use vector embeddings of a new or changed node in comparison with vector embeddings of existing nodes to find a similar node in a same region of the hierarchy (i.e., with a common ancestor), and the similar node may be used as a template node to establish a connection with another hierarchy.

FIG. 1A illustrates a flow chart of an example process 100A to select a rules-driven process, an AI-driven process, or a hybrid process that identifies template record(s) from existing records in a source dimension for modeling change(s) to connection(s) with target dimension(s) based on updated record(s) in the source dimension. In block 102A, the rules-driven process receives update(s) to record(s) of a source dimension, such as a first set of data stored in one or more first database structures. At least some record(s) of the source dimension reference target dimension(s). For example, the target dimension(s) may be referenced using key value(s) of set(s) of data stored in database structure(s). For each first record of the updated record(s), block 104A includes identifying candidate connection(s) from the first record to the target dimension(s). For example, the candidate connection(s) may include base database structure(s) in the target dimension that correspond to initially changed values in the record(s) of the source dimension, as well as roll-up structures that are connected to those base database structure(s) in the target dimension.

Block 106A includes selecting whether to use rules-driven synchronization, AI-driven synchronization, or hybrid synchronization to identify the candidate connection(s), for example, on a dimension-by-dimension basis optionally specified by a corresponding user-specified setting for a dimension-to-dimension subscription. If a rules-driven process is selected, in block 122A, the data management system identifies target record(s) in the target dimension(s) using key value(s) from template record(s) discovered using rule(s). If an AI-driven process is selected, in block 124A, the data management system identifies target record(s) in the target dimension(s) using key value(s) from template record(s) discovered using AI. If a hybrid process is selected, in block 126A, the data management system identifies target record(s) in the target dimension(s) using key value(s) from template record(s) discovered using rule(s) and AI.

In one example, data from the source dimension may be filtered to exclude records that do not share a common parent or other common ancestor with the first record, and the selected process may be applied only to those records that were not excluded by not having the common ancestor. In another embodiment, records may be scored higher for use as a template node if they have a common ancestor but are not excluded from being a template node if they do not have the common ancestor.

The target record(s) identified from blocks 122A, 124A, or 126A are identified for use as candidate connections from the first record to the target dimension(s) concluding block 104A. In block 128A, after identifying the target record(s) in block 104A, example process 100A continues with updating the target record(s) to reference the first record using a key value of the first record. In block 132A, the first record is updated to reference the target record(s) using key value(s) of the target record(s). The first record may be updated once, with multiple references to target dimensions updated at the same time, or multiple times, with different references to different target dimensions updated each time.

Once the target record(s) have been updated in block 128A, block 134A includes receiving a request from a first application for information from the target record(s), and providing information about the first record(s) in response to the request. Other applications may also request data from other records and receive the updated information for incorporation into domain-specific application functionality such as predictions, forecasting, data analysis, process management, etc. Application(s) using data structures in the source domain may also use the updated information about other dimension(s) to respond to requests. In block 138A, a request is received from another application for information from the first record(s), and the other application provides information about the target record(s) in response to the request.

Data Hierarchies

Master data management tools may receive data from a variety of sources, and the received data may cause updates to a variety of subscribed systems that may use different applications and/or different databases than the source systems. For example, the updates may be provided to domain-specific forecasting tools that help users operate an organization along the domain. Updates to the subscribed systems may cause further updates to further subscribed systems, and so on. The master data management tools maintain one canonical definition of an object that can be consumed by a variety of applications and/or databases, with various different roll-up structures. Master data exists among the variety of applications and/or databases and constantly changes, impacting functionality of the various applications and/or databases. The master data reflects core objects referenced by the various applications and/or databases to tie different functionality back to these core objects. The master data represents new objects that are referenced by the various systems across different domains, not just new instances of sales, uses, or incidents involving the object that are transactional and specific to a single domain.

The master data as a whole changes frequently, which creates a need to synchronize the data between the different applications and/or databases to promote consistency in the way the core objects are referenced to provide different functionality between the different applications and/or databases. The different hierarchies of data stored by the different applications and/or databases may have vastly different structures and complexities, and a subset of the data, which may be limited to a specific field and value or cover a set of fields and values, being synchronized between the different applications and/or databases may be stored or represented differently in each hierarchy. Values from one hierarchy may be mapped to corresponding values of another hierarchy, but the values may not be exactly the same to be considered synchronized. For example, a location may be stored as "California" in one hierarchy and "CA" in another hierarchy. A mapping may be provided to synchronize "California" to "CA". Further, the values may exist at different levels of the hierarchy in each of the hierarchies, such that "California" is under "Country-State" in one location-based hierarchy but under "Employee-State" in another person-based hierarchy. Updates to either hierarchy may trigger downstream logic or downstream subscriptions, which may cause updates to other data in the same hierarchy or in other hierarchies as derived from the originally updated values.

In one example, employee hierarchies are maintained and sourced by human resources (HR) or an employee data management system. There are other systems, such as systems that manage expenses, finance, projects, sales, taxes, etc., that may need access to the employee hierarchies for those purposes, optionally with different roll-ups. For example, a manager hierarchy view (e.g., spend by manager, sales by manager, etc.) and a geographic distribution view (e.g., sales in Texas, sales in Utah, sales in California, sales in Illinois, etc.) may be shown for expenses, finance, projects, sales, etc. The roll-ups are not maintained natively by the employee data management system but exist in the master data management system that links dimensions or separate datasets together. Dimensions managed by an application may subscribe to roll-up data to receive updates as the roll-up data changes over time, and so roll-up data is available on other dimensions that are natively maintained by other applications. Different dimensions may have different roll-ups available via connections between these dimensions, and some dimensions may have multiple roll-ups due to connections with multiple other dimensions.

The many dimensions available for roll-up may be managed by same or different applications, with varying formats and varying hierarchies of data available. Attributes of records in one dimension may be useable as a roll-up dimension for another dimension. For example, John Smith may live in San Jose, California. When a record is created for John Smith in an HR system, the attribute San Jose, California may be stored in association with John Smith. The HR system may natively store data to roll up based on managers, such that another attribute of the new node points to John Smith's manager, Jane Doe. When other dimensions subscribe to the data from the HR system, the location attribute may be used as a roll-up structure so the other dimensions can be viewed by geography. For example, the other dimensions may be filtered, sorted, or grouped by employee location even though the other dimensions do not directly manage the employee data. In the example, as new employee nodes are added, the new nodes may be associated with a location node of San Jose, California, so the location node serves as a pre-computed aggregated or roll-up proxy for all employees in San Jose, California, that can be consumed by other nodes without having to access or have visibility into the hierarchy of the employee dimension or individual employee nodes.

As another example, projects may be assigned to employees in a projects data hierarchy by a project management application. An employee dataset may subscribe to the projects data hierarchy so a human capital management application that manages employee data can also view active project counts for each employee to gauge busyness of the employee. In this example, the employee dimension may subscribe to project counts without visibility into the underlying projects data hierarchy. The new projects node may also reference the employee node and be updated when the employee node is updated.

In yet another example, a first dimension may be derived from a second dimension even though the second dimension does not contain sufficient information to reconstruct the first dimension. In other words, the first dimension is not merely an attribute of the second dimension. For example, a first dimension may be a list of "top 50 managers," and the second dimension may be employees with an indication of which employees are managers. The first dimension may include additional information, such as rankings, automated scores, weights of characteristics, manual ratings, and/or other details, that result in a list of top 50 managers. In order to pull information about the top 50 managers, such as a manager's full name, the reference back to the employees dimension is used. Other dimensions may subscribe to or be dependent on the list of the top 50 managers, and so on. In order to pull location about the top 50 managers, a reference to a location dimension may be used to intersect the identities of the top 50 managers with employee identities at locations stored in the location dimension.

Different dimensions may include arbitrary or user-defined data that cannot be determined based on other dimensions but that may still reference records in other dimensions as members. As another example of these user-defined attributes, a location dimension may include a sales region that can change over time. The employee records may include an employee's work address but not necessarily the sales region. A location dimension may list which employees are in which sales region based on the employee's work address. Some employees may even be assigned to other sales regions that do not coincide with the employee's work address. Without knowing the sales regions and individual assignments, the employee dataset cannot be used to recompute the sales region information from the location dimension even though the region information may reference location records.

The data may be provided by a data management user by uploading data into the system or otherwise inputting data fields into the system. The uploaded data may serve to update records in a source dimension, and the uploaded data may be presented in a hierarchically marked up file that includes fields separated from values and records using delimiters, values separated from fields and records using delimiters, and records separated from fields and values using delimiters. For example, the data may be provided using a flat file with an expected structure or a hierarchically marked up file such as a JavaScript Object Notation (JSON) or Extensible Markup Language (XML) file, where fields and values are separated by markup tags, sections, or other delimiters, and individual records are separated by markup tags, sections, or other delimiters. Data may also be provided via an Application Programming Interface (API) from other applications into the data management system, where the other applications use API commands to insert nodes into the hierarchy and assign values to fields of the nodes.

Once the data is uploaded into the data management system and stored according to target data hierarchies, the master data management tool allows forecasting and planning operations to be performed across datasets that exist with different hierarchies linked together. These forecasting operations may be performed to predict operations for a next period of time based on a prior period of time. For example, sales in a region for a next month or widgets produced by a factory for a next month may be predicted based on data from a prior month. The predictions may use roll-up or otherwise aggregated data from different dimensions.

The uploaded data may be subject to data pre-processing and post-processing steps to normalize the data to match expected formats of expected data values. For example, imported dates may have been pre-processed prior to upload, in another data management system, to format expected dates in a date format. As another example, imported currency values may be post-processed, after upload in the data management system, to use a common currency denomination estimated to a consistent place value. Other normalizations may include changing state names to a common abbreviated format, correcting capitalization, spacing, and punctuation of proper names, etc.

Connecting a node from a first dimension representing one hierarchy of data to a second dimension representing another hierarchy of data may be done by associating a record ID or some other key value of the first dimension with a key value of the second dimension. For example, a particular person node in a person dimension may have a person ID, which uniquely identifies the particular person node among the nodes in the person dimension. If the particular person node becomes associated with a "West" division of a regional dimension, the person ID from the person dimension may be added to a record associated with the "West" division in the regional dimension as a foreign key. The record associated with the "West" division in the regional dimension may similarly have a record ID, such as Division ID, that may be stored in association with the person record for the particular person node in the person dimension as a foreign key. After the keys have been stored, the regional dimension record may be referenced or identified from the person record, and the person record may be referenced or identified from the regional record.

When a new node is added to a hierarchy that is interconnected with other hierarchies, decisions are made on whether and how to connect the new node to the other hierarchies. For example, a new employee node may include a work location of Redwood City, California, and the new employee node may be connected to a "West" region of a "Location" dimension. Based on the employee's job description of "Software Architect," the new employee node may be connected to a "Software Developers" dimension but not to a "Sales Personnel" dimension. Even if the data is accurate, it may be difficult to determine whether and how to connect with a given dimension. For example, a new employee added in Boise City, Oklahoma, may be added to the "East" or "West" region, depending on how such regions are defined. Ultimately, a user connecting the new node to the other hierarchies may connect the node incorrectly. Different users making connections for new nodes over time may apply different logic for determining whether and how to make the connection, resulting in data divergence and an inability to track and synchronize information along the inconsistently maintained dimension.

In one embodiment, a new node may be added to a hierarchy and connected to other hierarchies based on one or more other selected nodes in the hierarchy. The new node may be "modeled after" the one or more other nodes along certain dimensions. For example, a new user in Redwood City, California, may be modeled after another user who is also in Redwood City, California, along the location dimension. As another example, a new user with a "Software Architect" job description may be modeled after another user with the "Software Architect" job description along the "Projects" or "Software Developers" dimensions. A user adding the new node to the hierarchy may select which nodes to use for modeling connections for the new node along different dimensions. Modeling after an existing node may cause the new node to have similar or same connections along the dimension as the existing node. For example, the "Redwood City" employee may have a connection with a "California" node in a "State Taxes" dimension because the existing node also has a connection with the "California" node. As another example, the new "Software Architect" employee node may receive a same connection in the "Projects" dimension as another "Software Architect" existing employee node.

A user adding a node to a hierarchy might not even be aware of the other connections made to the hierarchy. The hierarchy may exist among tens or even hundreds of dimensions of hierarchies, some of which may be connected to the hierarchy and others of which may not be connected to the hierarchy. The user may select a node to model after and establish some connections to other dimensions but may not have the subject matter expertise for every hierarchy to (a) know that the other dimensions exist, and (b) know how to make consistent connections between new nodes and the other dimensions. These shortfalls make it difficult to keep the hierarchies synchronized between different applications.

Also, a perfect "model after" node may not exist even if the user knows which attributes to look for in a perfect "model after" node. For example, this employee may be a first employee from a certain city or even from a certain state, or a first employee with a certain job title. Without a perfect "model after" node, the user would need to determine which regions or which projects to assign, as there is no example that is identical or nearly identical to the new node. The node may be added without any connections at all, but then metrics associated with the new node may be missed altogether or miscategorized in aggregate roll-up calculations that provide predictions for the organization as a whole. As mistakes are discovered in the aggregate calculations, connections may be established to fix the mistakes in an after-the-fact manner that has already consumed significant amounts of time and manual analysis.

Aside from the manual effort involved, relying on human know-how to connect new nodes to a hierarchy has many shortcomings even if a subject matter expert is involved. Machines can establish these new connections in different and more data-intensive, algorithmically deterministic, and finer-grained ways than humans, often with better results even though subject matter expertise is not used to guide the connections.

When updates are performed between hierarchies, regardless of the manner in which the updates are performed, database structures may be updated based on new or updated nodes from other hierarchies. Any logic (back-end flows, processes, notifications, automations) that is triggered by changes in the database structures gets triggered as the database structures are changed from new or updated nodes in the other hierarchies. The logic may trigger further changes in the same database structure or other database structures, or may trigger actions performed by the data management system or another system. For example, automatically computed fields may be re-computed based on the changes in the target dimension. In another example, values are assigned to roll-up structures in the target dimension, and those roll-up structures may be used to re-compute automatically computed values that are based on the roll-up structures. In a particular example, items may be summed over a region of a location dimension for which the city, state, and region are updated due to a change to a person's city information in a person dimension.

Rules-Driven Synchronization

In one embodiment, when adding a node to a hierarchy, a data management system determines a closest neighbor or other template node existing in the hierarchy. For example, the template node may be determined based on a specified characteristic associated with the hierarchy or based on a specified combination of characteristics associated with the hierarchy. For example, the template node selection may have a preference for nodes sharing a same parent (e.g., a same manager in the case of an employee) or other ancestor, and a further preference for nodes sharing one or more same values for one or more fields (e.g., a home or work city name, home or work state name, or building name in the case of a location). The template node may be selected as the model after node for the new node. A different model after node may be selected to establish connections to different dimensions, and different user-configurable rules may be established to select the template node for each of the dimensions. Dimensions may also be grouped together such that a same rule or rules may be used to select a template node for multiple dimensions.

The closest neighbor may be used as a template node to establish connections with a corresponding dimension or dimensions for which the template node was selected. For example, the template node may cause a connection for a "Redwood City" employee to be made with the "West" region in a location dimension based on another employee in "Redwood City" that was also connected to the "West" region. Different template nodes may be selected for different new nodes and for different dimensions of the new nodes, and the different template nodes may establish dimension-specific connections or dimension-generic connections with other dimensions. For dimension-generic connections, the template node may be used to establish connections with multiple different dimensions. For dimension-specific connections, the template node may be used to establish connections with a single dimension, and other dimension-specific templates may be used to establish connections with other dimensions.

The rules may be stored and customized by subject matter experts that know which attributes should drive which connections with which dimensions. Different subject matter expert users may save rules for establishing connections with different dimensions, such that a single subject matter expert does not need to be aware of the logic of each set of rules. The rules may be defined by selecting a dimension or dimensions for which to establish the connection and a specified field or fields that should drive the connection. The rules may be applied by finding an existing record value that matches a new record value for the specified field or fields, and establishing the same connection(s) as the existing record for the selected dimension or dimensions. The task of manually connecting a single node to existing dimensions may be just as time-consuming as the task of establishing rules to automatically connect the single node to existing dimensions, but the rules may be applied to hundreds or thousands of nodes without requiring manual connections to be made on a node-by-node basis.

Figure 1B:
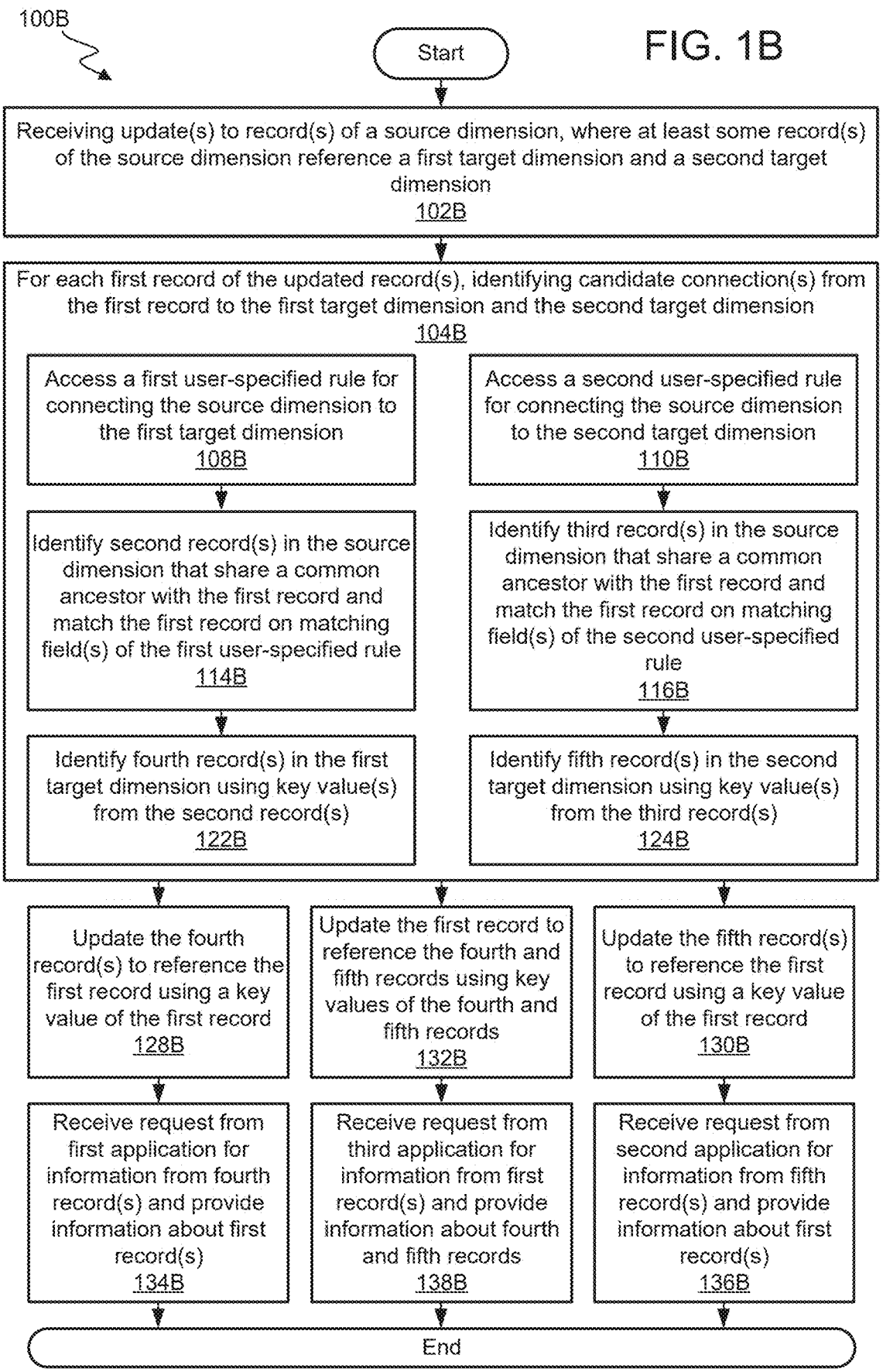
FIG. 1B illustrates a flow chart of an example rules-driven process that identifies template record(s) from existing records in a source dimension for modeling change(s) to connection(s) with target dimension(s) based on updated record(s) in the source dimension.

FIG. 1B illustrates a flow chart of an example rules-driven process 100B that identifies template record(s) from existing records in a source dimension for modeling change(s) to connection(s) with target dimension(s) based on updated record(s) in the source dimension. In block 102B, the rules-driven process receives update(s) to record(s) of a source dimension, such as a first set of data stored in one or more first database structures. At least some record(s) of the source dimension reference a first target dimension and a second target dimension. For example, the first target dimension may be referenced using key value(s) of a second set of data stored in second database structure(s), and the second target dimension may be referenced using key value(s) of a third set of data stored in third database structure(s). For each first record of the updated record(s), block 104B includes identifying candidate connection(s) from the first record to the first target dimension and the second target dimension. Block 104B includes, in block 108B, accessing a first user-specified rule for connecting the source dimension to the first target dimension, and, in block 110B, accessing a second user-specified rule for connecting the source dimension to the second target dimension. The user-specified rules may each comprise matching field(s) of the source dimension to use for finding a template record that matches a changed or updated record. The matching field(s) may utilize field(s) that directly changed and/or roll-up fields that are determined based on the changed field(s).

Block 104B further includes, in block 114B using the first user-specified rule of block 108B, identifying second record(s) in the source dimension that share a common ancestor with the first record and match the first record on matching field(s) of the first user-specified rule. Using the second user-specified rule of block 110B, block 116B includes identifying third record(s) in the source dimension that share a common ancestor with the first record and match the first record on matching field(s) of the second user-specified rule. Although examples are described with respect to finding the matching fields in a particular existing record, more complex examples include when the matching fields exist in multiple candidate record(s), and one of the candidate record(s) may be selected as a template record. Such selection could occur based on the first found candidate record that matches the conditions of the matching field(s). In another example, matching candidate record(s) may be clustered, and a record from the largest cluster of matching candidate records may be selected.

In one example, data from the source dimension may be filtered to exclude records that do not share a common parent or other common ancestor with the first record, and the matching fields may be applied only to those records that were not excluded by not having the common ancestor. In another embodiment, records may be scored higher for use as a template node if they have a common ancestor but are not excluded from being a template node if they do not have the common ancestor.

Block 104B then concludes in blocks 122B and 124B with identifying fourth record(s) in the first target dimension using key value(s) from the second record(s) and identifying fifth record(s) in the second target dimension using key value(s) from the third record(s). The fourth record(s) identified from the sub-process of blocks 108B, 114B, and 122B and the fifth record(s) identified from the sub-process of blocks 110B, 116B, and 124B are identified for use as candidate connections from the first record to the first target dimension and the second target dimension, respectively.

In block 128B, after identifying the fourth record(s) in block 122B, example process 100B continues with updating the fourth record(s) to reference the first record using a key value of the first record. In block 130B, after identifying the fifth record(s) in block 124B, example process 100B continues with updating the fifth record(s) to reference the first record using a key value of the first record. In block 132B, the first record is updated to reference the fourth and/or fifth records using key values of the fourth and/or fifth records. The first record may be updated once, with multiple references to target dimensions updated at the same time, or multiple times, with different references to different target dimensions updated each time.

Once the fourth record(s) have been updated in block 128B, block 134B includes receiving a request from a first application for information from the fourth record(s), and providing information about the first record(s) in response to the request. Other applications may also request data from other records and receive the updated information for incorporation into domain-specific application functionality such as predictions, forecasting, data analysis, process management, etc. For example, block 136B includes receiving a request from a second application for information from the fifth record(s), and providing information about the first record(s) in response to the request. Application(s) using data structures in the source domain may also use the updated information about other dimension(s) to respond to requests. In block 138B, a request is received from a third application for information from the first record(s), and the third application provides information about the fourth and fifth records in response to the request.

In one embodiment, the matching field(s) of the user-specified rule(s) may include required field(s) and preferred field(s). The data management system may identify a template node by first filtering out records that do not satisfy the required field(s) and then by ranking records using scores based on whether or not the records match the preferred field(s). Same or different scores may be assigned to different records based on whether the records match the preferred fields, and records may be selected based at least in part on the scores. For example, a record matching a preferred field may receive a higher score than a record not matching the preferred field, and the record with the higher score may be more likely to be chosen as a template node according to the user-specified rule(s).

The data management system may auto-apply changes or may prompt a user to review changes before the changes are applied, depending on user preference(s) indicated, for example, in the user-specified rule(s). The preferences may vary from rule to rule and target dimension to target dimension, and for different source dimensions. If changes are auto-applied, records may be updated automatically, such as in example blocks 128B, 130B, and/or 132B, once candidate connections have been identified, for example in block 104B. The auto-updates to the records may be performed without prompting a user for confirmation before updating the records in blocks 128B, 130B, and/or 134B. The user might not be prompted any time after receiving updates, such as the updates received in example block 102B, and/or any time after identifying candidate connections, such as the candidate connections identified in example block 104B.

In various embodiments, a selected template record may have multiple matching connections to a target dimension by referencing different key values of different data structures in the target dimension. For example, the template record may reference roll-up structures in the target dimension as well as other structures in the target dimension. In these embodiments, key values used to reference these structures in the target dimension may be retrieved from the template record and used to establish connections to the target dimension for the updated or changed record in the source dimension. The records corresponding to the key values in the target dimension may be updated to reference key value(s) of the changed record(s) in the source dimension, as well as the changed record(s) in the source dimension being updated to reference key value(s) of the structure(s), possibly including roll-up structure(s), in the target dimension.

Figure 2A:
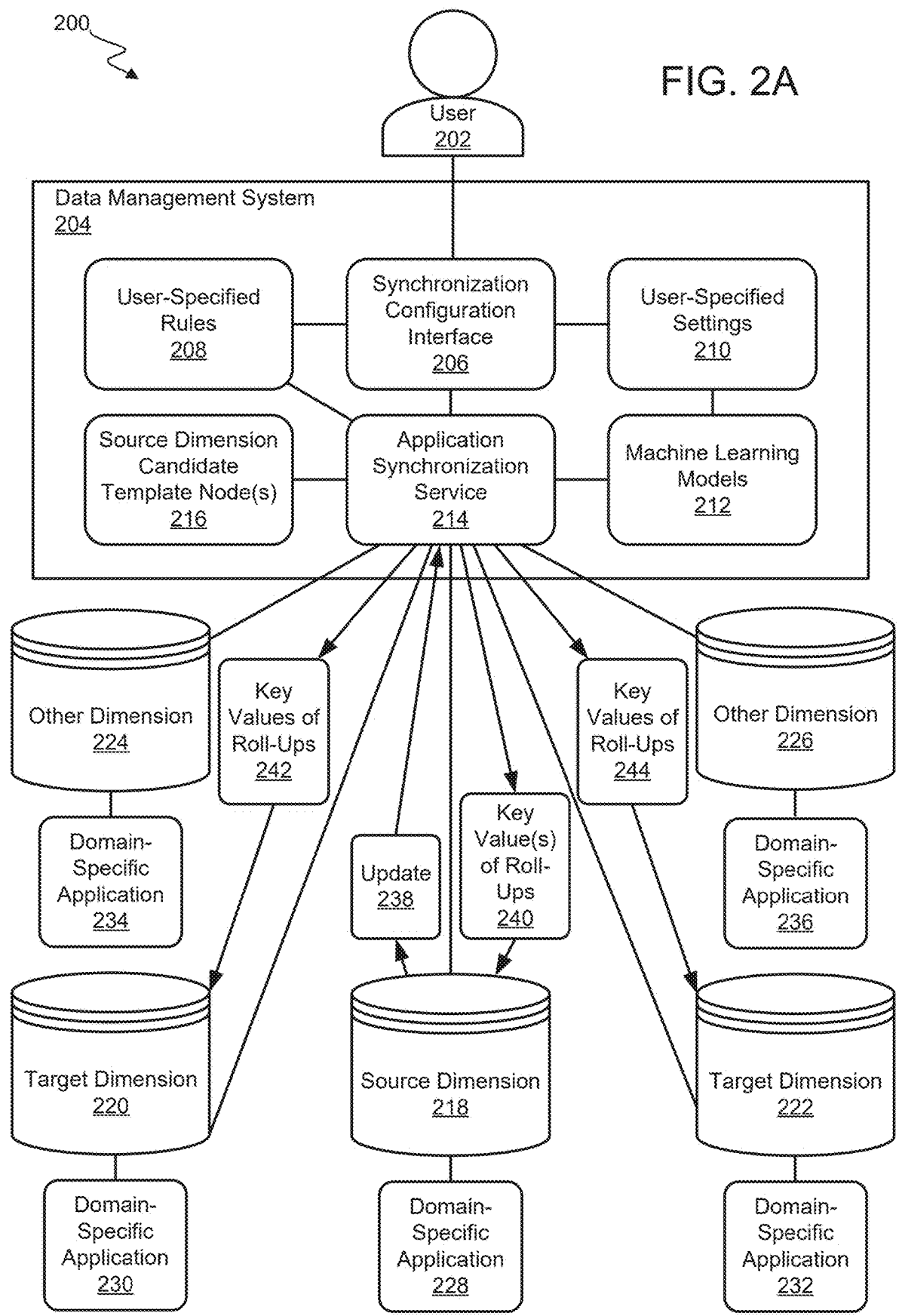
FIG. 2A illustrates a system diagram showing an example data management system that uses a rules-driven process, an AI-driven process, or a hybrid process that identifies template record(s) from existing records in a source dimension for modeling change(s) to connection(s) with target dimension(s) based on updated record(s) in the source dimension.
Figure 2B:
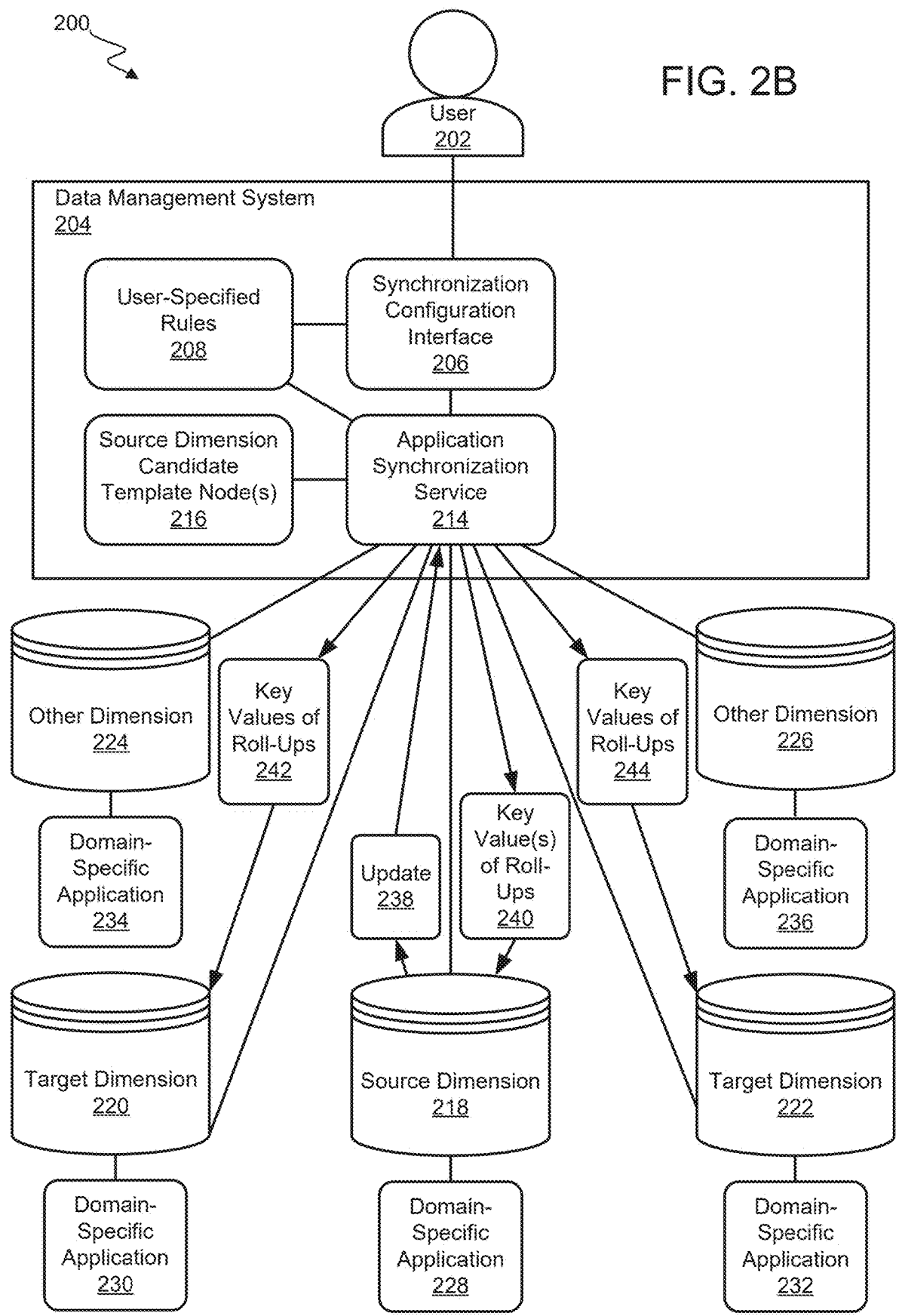
FIG. 2B illustrates a system diagram showing an example data management system that uses a rules-driven process that identifies template record(s) from existing records in a source dimension for modeling change(s) to connection(s) with target dimension(s) based on updated record(s) in the source dimension.

FIG. 2B illustrates a system diagram showing an example system 200 that uses a rules-driven process that identifies template record(s) from existing records in a source dimension for modeling change(s) to connection(s) with target dimension(s) based on updated record(s) in the source dimension. For example, the template record(s) may be used to determine what changes are needed in a target dimension, including roll-up structures in the target dimension, when a value and/or roll-up structures based on the value are changed in the source dimension. User 202 interacts with synchronization configuration interface 206 of data management system 204 to configure user-specified rules 208. Application synchronization service 214 uses user-specified rules 208 to apply changes to target dimensions 220 and 222 based on an update 238 from source dimension 218. The changes to propagate are determined using source dimension candidate template node(s) 216, which may be determined by application synchronization service 214 using user-specified rules 208 according to a rules-driven process. The changes are applied by sending key value(s) 242 and 244 of the updated source dimension record and/or roll-up structures in the source dimension dependent on the updated source dimension record to target dimensions 220 and 222 for changing any number of target records or roll-up structures in the target dimensions, and the key value(s) 240 of the corresponding target dimension record(s) and/or roll-up structures in the target dimensions that are changed, based on the template record, to source dimension 218 for updating any number of records that are impacted by the changed records in the target dimensions. Other dimensions 224 and 226 not referenced by the source dimension 218 or the updated data may remain unchanged by the update, while target dimensions 220 and 222, as well as source dimension 218, are changed by the update. Domain-specific applications 228, 230, and 232 may use dimensional data that reflects the updates, and domain-specific applications 234 and 236 may continue to interact with other dimensions unimpacted by the changes.

Figure 3A:
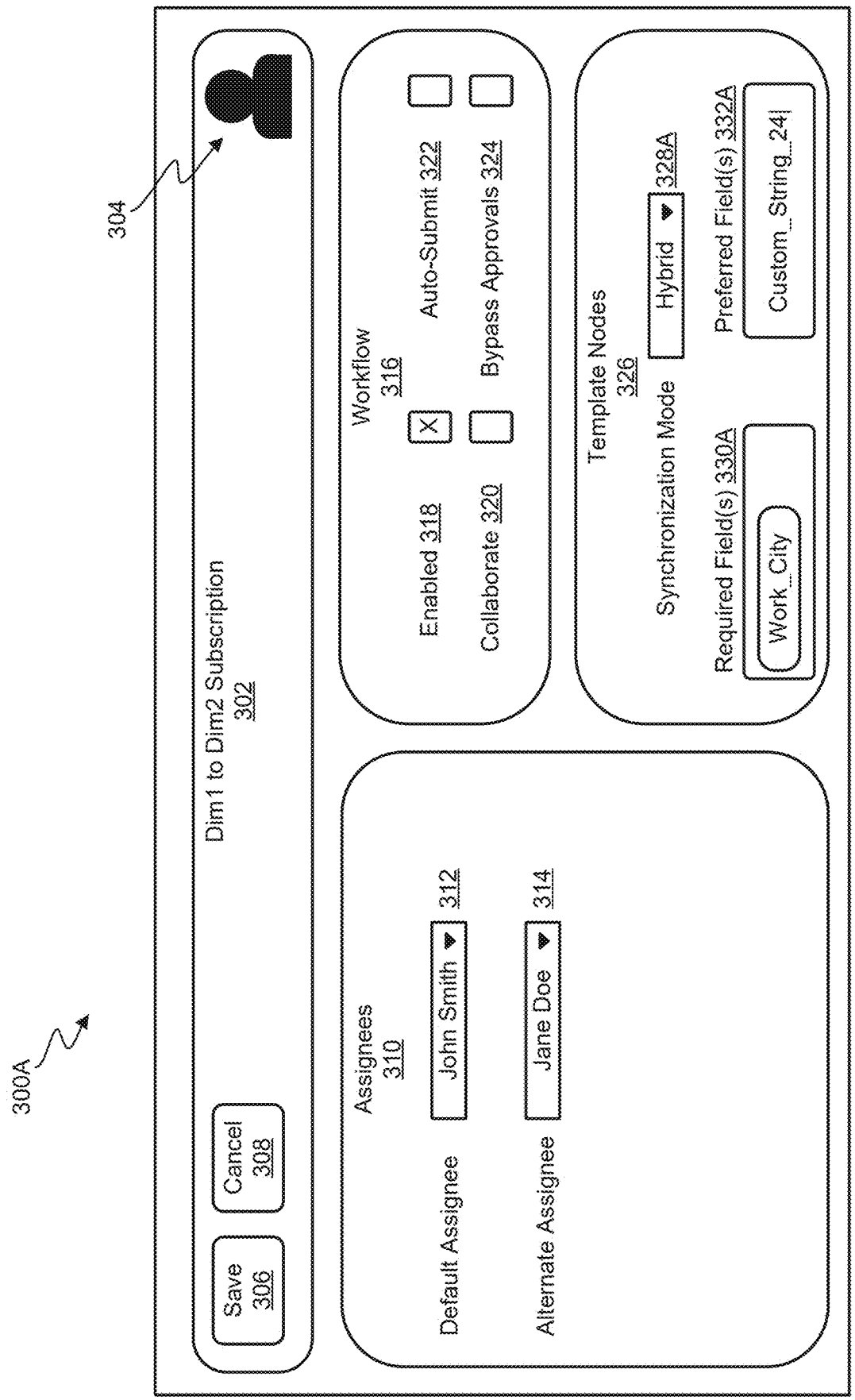
FIG. 3A illustrates a diagram of an example user interface showing a configuration of an example hybrid process that identifies template record(s) from existing records in a source dimension for modeling change(s) to connection(s) with a target dimension based on update record(s) in the source dimension.
Figure 3B:
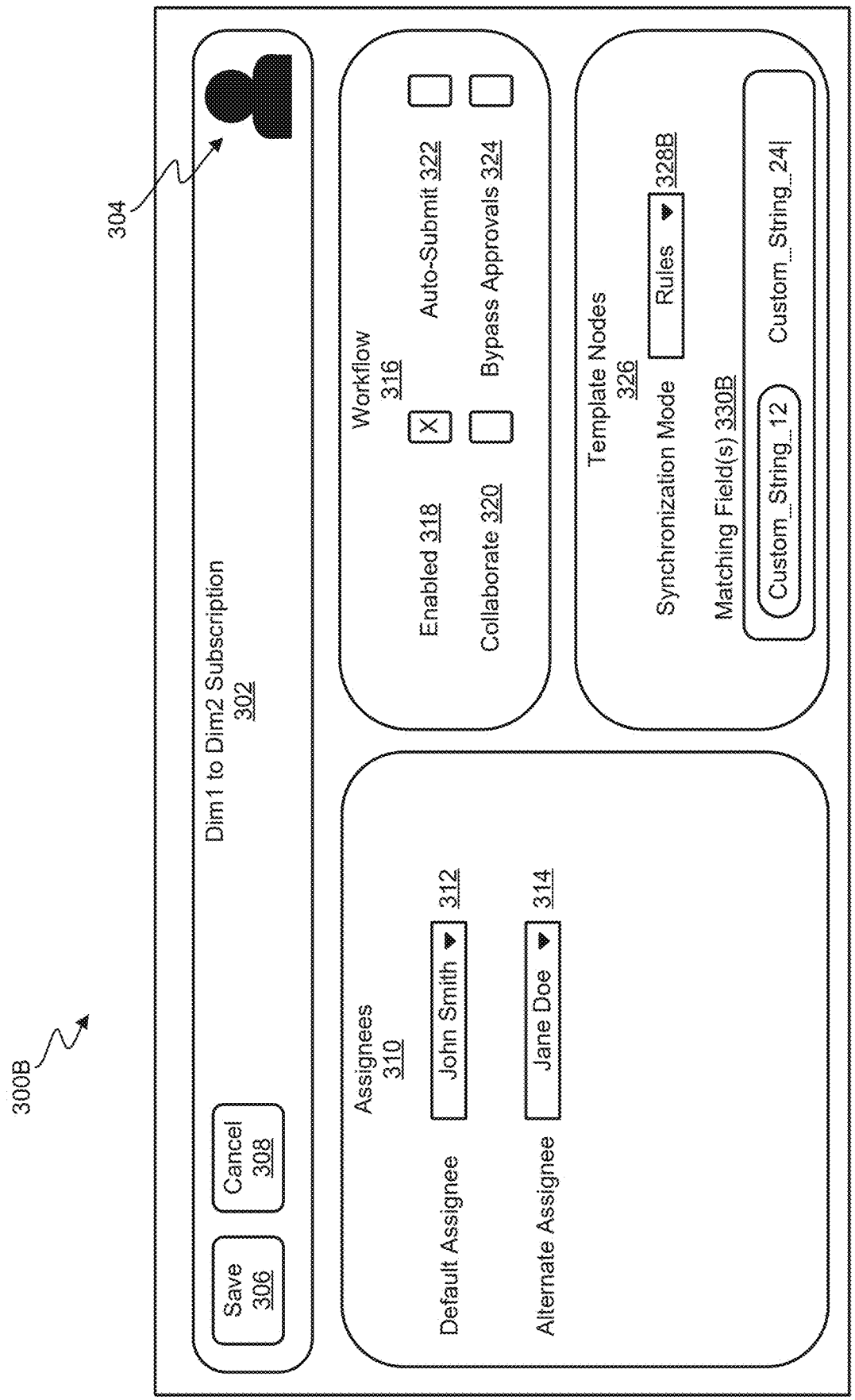
FIG. 3B illustrates a diagram of an example user interface showing a configuration of an example rules-driven process that identifies template record(s) from existing records in a source dimension for modeling change(s) to connection(s) with a target dimension based on update record(s) in the source dimension.

FIG. 3B illustrates a diagram of an example user interface 300C showing a configuration of an example rules-driven process that identifies template record(s) from existing records in a source dimension for modeling change(s) to connection(s) with a target dimension based on update record(s) in the source dimension and/or roll-up structure(s) in the source dimension based on the updated record(s). As shown, a header 302 describes that the interface is for a Dim1 to Dim2 subscription or setting, where Dim1 is a source dimension and Dim2 is a target dimension. The interface may have user-specific information depending on which user is logged into the system and which dimensions the user has access to view and/or modify. The user logged into the system is indicated by a user icon 304 identifying the user. Interface 300B may also have options to save 306 or cancel 308 changes made to the dimension-to-dimension subscription being modified. As shown, assignments of template nodes and, ultimately, assignments of connections to target dimensions are reviewable by user-specified users, called assignees in assignees section 310. A default assignee 312 is specified as John Smith, a user who receives recommended mappings to the target dimension as records in the source dimension are added or updated. An alternate assignee 314 is specified as Jane Doe, a user who may receive a notification of the recommended mappings that have not yet been confirmed, rejected, or otherwise reviewed by the default assignee, for example, after a period of time has passed.

Interface 300B also includes workflow options 316. The enabled option 318 is selected to indicate that the dimension-to-dimension setting or subscription is active for live updates between the source dimension and the target dimension. If the enabled option 318 were unselected, the setting would be skipped as live updates are made to the source dimension. The collaborate option 320 is unselected, indicating that the setting is owned and managed by user 304 without inclusion of other users. If the collaborate option 320 was selected, user 304 may specify which other users are allowed to modify the dimension-to-dimension setting. Auto-submit option 322 is unselected, indicating that recommendations from the setting should not be automatically applied to the target dimension. If the auto-submit option 322 were selected, recommendations for the setting would be automatically applied to the target dimension. Bypass approvals option 324 is unselected, indicating that the default assignees are presented with the connections that were made or are to be made by the system. If bypass approvals option 324 were selected, notifications to assignees may be paused for updates made by the data management system.

Interface 300B also includes settings for template nodes 326, which include an option 328B to select a synchronization mode from rules-driven, AI-driven, or hybrid. As shown, a rules-driven process is selected to cause the setting to use matching field(s) to find a template node. Also as shown, matching field(s) 330B may be specified to guide the selected process to finding a template node for connecting to the target dimension as described herein.

If the user-specified rule(s) indicate that review is to be provided, review may be provided in-line by a user providing update(s) to record(s) or by another user identified as part of the user-specified rule(s). The other user prompted for confirmation of the changes may be a different user than the user who initially updated the record(s). The user prompted for confirmation of the changes may be notified, according to the corresponding user-specified rule, that a record of a target domain is being proposed for use as a candidate connection, or that a record of the source domain is being proposed for use as a candidate template record that references the record of the target domain. Users may review changes together in bulk, asynchronously and out-of-band, or separately as prompted synchronously when the changes occur. Different users may confirm different changes for different dimensions, and those confirmations may come at different times stemming from the same changes to data in the source dimension.

Occasionally, the user-specified rules might not find a matching template node for use to establish connection(s) with target dimension(s). If no such record is found after searching for records matching the updated record on the matching field(s) for a given dimension, the data management system may notify a user that the data management system failed to identify a template record that satisfies the user-specified rule(s) that apply. As a result, the data management system may cause display of a notification that no matching record was found to connect the changed record to the target dimension(s) for which no matching record was found. The notification may include an option to select a template record or to select a value for connecting the changed record to the target domain without selecting the template record.

In one example, an analytic application stores data in Dim2, and the analytic application is subscribed to data along another dimension, such as a people dimension, Dim1. A user interface may display options for creating the subscription from Dim2 to Dim1, as well as a selection of which field(s) to use to find a template node to use for modeling the connection between Dim1 and Dim2. The connection between the dimensions may be established as a "model after" connection, and a field of Dim1 may be selected to guide how connections are made with Dim2. When the field of Dim1 in a new or updated record matches an existing record in Dim1 already connected to Dim2, the new or updated record may be modeled after the existing record to establish the same connections to Dim2. The properties to match may be specified as required matches before a connection is automatically recommended or established or preferred matches that are attempted to be found to establish or recommend a connection but not required before a connection can be automatically established or recommended.

The rules may specify whether automated changes should be reviewed or not when a node is created and/or when a node is modified. For example, upon creation of a node by a data management user, the data management user or another user such as a subject matter expert for the subscribed data set may be prompted, via a notification to the data management user or another user, or via another user interface option, to add the node to certain dimensions using certain template nodes and/or certain mapping fields and values of those template nodes. The user interface option may display proposed connections between new node(s) and existing dimensions. In one embodiment, the proposed connections may be displayed concurrently with an underlying reason or rule condition that triggered the proposed connection and/or a template node that was used to recommend the proposed connection. The data management user or other user may accept or reject various proposed connections in bulk, for example, on a same page of a user interface, corresponding to the same added node. If the data management user or other user added multiple nodes at a time, the data management user may accept or reject various proposed connections in bulk, on a same page of a user interface, corresponding to the multiple added nodes. For example, the different proposed connections may be displayed along with checkboxes to accept or reject the proposed connections, and the user may scroll up or down the page to check or uncheck the checkboxes. The checkboxes may be checked or unchecked by default. The changes may await review by the data management user or other user, or the changes may be applied automatically and rolled back if rejected by the data management user or other user.

In some scenarios, for a given node, the data management system may not be able to match the given node to a specified value of an existing rule, or may not be able to match a mapping value derived from the given node (e.g., the raw value from the node or a deterministic transformation of the raw value, such as a 2-letter representation of a full name of a state, or a YYYY-MM-DD representation of a date formatted as MM-DD-YYYY) to an existing value in an existing dimension, and, as a result, an automated connection from the node to a dimension corresponding to the rule may not be automatically created. The data management user or another user such as a subject matter expert for the subscribed data set may be notified of any nodes for which rules were unable to find a matching dimension value, and the data management user or other user may find a corresponding dimension value to use for the node or confirm that no connection should be made to the unmatched dimension. The notification to the data management user may indicate which rule was attempted to be matched, whether a template node was found, if a template node was found, the template node that was attempted to be used, which value was attempted to be connected in the corresponding dimension, and/or what error was experienced in attempting to connect the value to the node. The notification may include an option to select another dimension value to select to connect to the node or another node to use as the template node, and may include an option to retry the connection and/or abort the connection. If the connection is aborted, the node remains unconnected along the dimension. The notification may include these options for multiple nodes in which dimension connections failed, including options to remedy or abort the connections for each of the failed dimension connections. These options may be displayed in rows with columns to change the template node and/or the dimension value to use, and an option to retry or abort for each row.

In one embodiment, as node values change, assigned dimensions and/or other roll-up values in the assigned dimensions may also change according to the rules. If a user was initially in the "West" region but moves from Redwood City to New York, the user may be changed to the "East" region in a location table if, after moving, the user's location matches a template node location of New York, and the template node is assigned to the East region. The roll-up structure for "Big Cities," which may track people or other activities in big cities, may also be updated to reflect that the user has moved into a city that corresponds to a value in the "Big Cities" roll-up structure when the user previously did not belong to any named values in the "Big Cities" roll-up structure. The addition to the "Big Cities" roll-up structure may be determined based on the template node for the user in New York who is also assigned to the "Big Cities" roll-up structure. The change of the user to the "East" region may occur automatically behind-the-scenes based on a change to, for example, the work address. On a rule-by-rule basis and/or as a default setting for all rules, the rules may be configured to be auto-applied when the conditions are met, or to trigger a notification that confirms or rejects the application of the rule. In one embodiment, a data management user is prompted, via a notification from the data management system, about changes to users that, if the users were new users, would prompt a different dimension assignment, and the data management user may approve or reject various re-assignments to dimensions that are suggested for various users. In one embodiment, when an automated change is rejected, the data management user may create a new node-specific rule that blocks automated changes and/or notifications about candidate changes for the node going forward. For example, the data management user may understand that the node is different from other more typical nodes in the data set and should not be migrated along with the other nodes as changes are made to nodes.

Blocking the node from automated changes and/or from notifications about candidate changes may also remove the node from being available as a closest neighbor node or template node to other nodes. In another embodiment, a separate setting may be used to block the node as a closest neighbor node or template node to other nodes. This setting may be selected because of the divergence of the node from what should be considered a typical node in the dataset.

In various embodiments, confirmations or approvals of automated changes, fixes to or abortions of unmatched nodes, and confirmations or approvals of automated connections may be provided to a different data management user than the data management user causing changes to the nodes or causing the additions of nodes. Different dimensions may be mapped to different data management users such that notifications of errors, fixes, approvals, confirmations, and/or abortions may be passed to one or more data management users corresponding to the dimension for which the notification occurred. In this manner, the relevant subject matter expert for the dimension may receive the notification of unhandled connections and efficiently resolve any decisions that need to be made with respect to the unhandled connections. For example, an HR subject matter expert may review city/state information due to an error experienced in connecting an employee to a location, and a tax subject matter expert may review information due to an error in finding a template node valid to make a tax connection for a new employee.

In a particular example, a data management user may upload 1000 nodes to a data management system, causing the data management system to attempt to make automated connections with 10 different dimensions each in different areas of subject matter expertise. The upload may experience 10 errors in each dimension of the 10 dimensions for 100 total automated connection errors. Each set of 10 errors corresponding to a dimension may be forwarded to a subject matter expert for the dimension, which may be the same or a different user than subject matter experts for other dimensions. The data management user uploading the 1000 nodes might not qualify as a subject matter expert for any of the dimensions and has completed the task of uploading the 1000 nodes. The 10 other subject matter experts may asynchronously review the 10 errors passed to each of them and make determinations to fix, abort, approve, or perform another action with respect to the errors. For example, the subject matter experts may update the dimension table, modify the rules, or even delete the unmatched record. The relevant subject matter experts may also get a report of successful connections that were made, along with a request to confirm the successful connections if such a confirmation is required by the rules.

In one embodiment, a subscription object is used to manage changes across different dimensions and their corresponding data hierarchies. One dimension of data may listen for changes from another dimension by subscribing to changes from the other dimension. When subscribing to changes, the subscriber may specify that the changes should be automatically applied (automatically matched and approved) or automatically matched and manually approved by the subscriber. The subscriber may specify what rules to use for matching nodes of the other dimension to a target dimension, and the rules may include an option for finding a template node based on one or more specified fields and one or more specified values that are matched or most closely matched by an existing node, along with an option for whether the existing node is required to share the same parent or other common ancestor node. The template node is found according to the rules and used to match against the target dimension according to the subscription.

The target dimension may have other subscriptions to apply changes to further target dimensions, and the changes to the target dimension may trigger these other changes to the further target dimensions. The changes to the further target dimensions may find a template node among the target dimension and use the template node to add or modify connections in the further target dimensions, according to the rules specified for the other subscriptions.

Intelligently Selected Fields and Rules

A user may interact with a rule configuration interface to specify rules and matching field(s) for the rules between different dimensions. Multiple rules may be provided, and each of the relevant rules may be evaluated as data belonging to a dimension is changed.

In one embodiment, one or more rules are predicted for selecting a template node using data-driven approaches or artificial intelligence. In this example, the data management system may analyze the data distribution of a source dimension where a new node may get created or a change may occur and the data distribution of existing connections to a target dimension subscribed to changes in the source dimension. A correlation may be determined based on existing connections between the dimensions and existing fields or combinations of fields in the source dimension. The existing fields or combinations of fields that are most correlated with the existing connections to the target dimension may be suggested as proposed rules for selecting the template node. More generally, rule(s) or mapping field(s) of rule(s) may be selected based on a likelihood that existing records of the source set of data that are already connected to a same record of the target set of data also already match on the field(s) that should be used as mapping field(s) of rule(s). The selected rule(s) or mapping field(s) may be displayed as an option on the user interface for configuring rules or matching fields.

In one embodiment, rather than relying on correlation of fields field-to-field, the data management system uses artificial intelligence to recommend fields for use in rules. The data management system may generate vector embeddings of nodes that have been mapped to the target dimension and clusters the nodes mapped to the same or similar values in the target dimension. Aggregate vector embeddings may be determined for each of the clusters based on an average, minimum, maximum, or other aggregate combination of the vector embeddings in the cluster. Embedded features having a highest predictive impact on a mapping value for a cluster or a mapping value for an individual vector embedding may be selected for inclusion in rules. Embedded features having a lowest predictive impact on a mapping value for the cluster or a mapping value for the individual vector embedding may be excluded from the rules. As a result of using clusters of vector embeddings to find the features with highest predictive impact, rule(s) or mapping field(s) of rule(s) may be selected based on a likelihood that existing records of the source set of data that are already connected to a same record of the target set of data also already match on the field(s) that should be used as mapping field(s) of rule(s). The field values corresponding to the highest impact features may be marked as required or preferred, and the field values corresponding to the lower impact features may not be marked for inclusion in the rules or may be marked as preferred but not required by the rules. These proposed rules may be recommended to a user configuring rules between dimensions or may be automatically saved when connecting dimensions together. The rules may be reviewed and modified in a rules configuration interface depending on user preference.

In one embodiment, the rule configuration interface includes recommended field(s) that may be used as matching field(s) for connecting a specified source dimension to a specified target dimension. The recommended field(s) may be selected based at least in part on a similarity between a first range of the particular one or more fields and a second range of one or more fields in the second set of data. If there are no existing connections to choose from, or not enough existing connections to lend themselves to a significant correlation determination, the data management system may determine a similarity between ranges of field values in different fields of the source dimension and ranges of field values available in a field designated to store connections to the target dimension from the source dimension. For example, if the source dimension has a field with values, across different records, of "east" and "west," and the destination has a connection to be updated to reflect dimension membership from the source dimension with the values of "East" and "West" in the target dimension, the data management system may determine that the "east" or "west" value in the source dimension should determine the value used for "East" or "West" membership in the target dimension.

Even if the values are not as closely matched as "east" to "East" and "west" to "West," an analysis of the available data values may determine that one or more fields of the source dimension have similar degrees of freedom or number of discrete values in the range as the membership field of the target dimension. For example, if the membership field of the target dimension only uses values "East" or "West," and a field in the source data has hundreds or thousands of variable values as street address information, the data management system may determine that the street address information is not compatible to use for driving the "East" or "West" connection. On the other hand, another field may store "Region 1" or "Region 2" and have only two degrees of freedom in the values that are stored. The other field may be selected as a candidate field for mapping to the "East" or "West" connection of the target dimension.

The degrees of freedom, value matches, near-value matches between the source dimension and the membership field of the target dimension, and/or matches or near matches between the field names of the source dimension and the target dimension may be used to recommend fields to use for creating rules, or to provide a higher or lower weight to certain fields that are compatible or incompatible, respectively, when using automated techniques for selecting a template node, such as the AI-driven synchronization and hybrid synchronization processes described in further detail herein.

In one embodiment, fields may be whitelisted or blacklisted for use from rules-driven synchronization and/or AI-driven synchronization. Whitelisted fields may be made available for use in a drop-down menu for quick selection to be included in a rule, or on a list of fields available to be tracked using vector embeddings for AI-driven synchronization.

Blacklisted fields may be blocked for use or inclusion in rules-driven synchronization and/or AI-driven synchronization. The whitelist(s) and/or blacklist(s) may be automatically or manually maintained and automatically or manually updated. For example, a variability, inconsistency, or low data quality of some fields may prevent the fields from serving as a good candidate for mapping to a dimension. As a result, the fields may be automatically added to a blacklist. Blacklisted field(s) may be excluded from being selected as matching fields in rules-driven processes, and/or blacklisted field(s) may be excluded for use in vector embeddings in AI-driven processes.

As another example, the consistently formatted discrete values of other fields may cause the other fields to be good candidates for mapping to a dimension, if the fields happen to be correlated with the dimension. As a result, the fields may be added to a whitelist.

The blacklist(s) and/or whitelist(s) may be maintained globally with respect to all dimensions and/or may be maintained in a dimension-specific manner such that different fields are whitelisted or blacklisted for use with different dimensions. For example, a format for one dimension might expect a date value for marking with a time-related dimensional value (e.g., quarter or fiscal year), in which case non-date values may be blacklisted, and a format for another dimension may expect a dollar amount for marking with an amount-related dimensional value (e.g., sales amounts or expenses), in which case non-dollar amounts may be blacklisted.

AI-Driven Synchronization

Many real-world scenarios are more complicated than matching existing field values in one dimension to existing field values in another dimension. In these scenarios, selecting a fixed set of rules, even if using artificial intelligence, may not be practical or accurate enough on a large scale. In another embodiment, the closest neighbor or other template node is selected using artificial intelligence without using a fixed set of rules that relies on a specific field for each template node determination. In this embodiment, the fields and combinations of fields of the source dimension may be used to generate vector embeddings that represent records in the source dimension. The connections in the target dimension may be used as labels for the vector embeddings to train a machine learning model to detect features in the source dimension vector embeddings that predict labels as connections to the target dimension. For example, source dimension vector embeddings leading to the same existing connection to the target dimension may be clustered into one or more clusters, and an aggregate vector embedding may be determined by averaging, computing a maximum or minimum, or determining some other aggregate combination of the vector embeddings in the cluster. The aggregate vector embedding may be used for comparison against vector embeddings of incoming nodes to match against the existing connection of the cluster corresponding to the aggregate vector embedding.

In one embodiment, separate vector embeddings for each existing node in the source domain that has an existing connection to the target domain may be compared separately against a vector embedding for the new or updated node in the source domain. An aggregate vector embedding does not need to be determined if each vector embedding is compared individually.

The vector embeddings for a node or cluster of nodes may be based on separate field values in the node and/or may be based on a concatenation of one or more or all of the field values for the node. The concatenated field values may be processed to detect further features that may be present within the concatenated text even if the features are detected across multiple fields.

FIG. 1C illustrates a flow chart of an example AI-driven process 100C that identifies template record(s) from existing records in a source dimension for modeling change(s) to connection(s) with target dimension(s) based on updated record(s) in the source dimension. In block 102C, the AI-driven process receives update(s) to record(s) of a source dimension, such as a first set of data stored in one or more first database structures. At least some record(s) of the source dimension reference a target dimension. For example, the target dimension may be referenced using key value(s) of a second set of data stored in second database structure(s). For each first record of the updated record(s), block 104C includes identifying candidate connection(s) from the first record to the target dimension. Block 104C includes, in block 108C, accessing a first user-specified setting that activates automated identification of a candidate connection for connecting the source dimension to the target dimension.

Block 104C further includes, in block 112C, generating a first vector embedding of value(s) of the first record. Using the first vector embedding of block 112C, block 118C includes determining a first distance between the first vector embedding and a second vector embedding of second record (s) in the source dimension. Also using the first vector embedding of block 112C, block 120C includes determining a second distance between the first vector embedding and a third vector embedding of third record(s) in the source dimension. Although examples are described comparing two distances to each other, more complex examples involve comparing many different distances to each other based on many different candidate record(s) that may be selected as a template record at least partially depending on the distance.

For example, the distance between the vector embeddings may be determined using a cosine distance between two vectors, using a Pearson correlation coefficient between two vectors, using a Euclidean distance between two vectors, and/or using any other vector distance metric.

In one example, before the distance is determined, data from the source dimension may be filtered to exclude records that do not share a common parent or other common ancestor with the first record, and distances may be determined between the first vector embedding and vector embeddings of those records that were not excluded by not having the common ancestor. In another embodiment, records may be scored higher for use as a template node if they have a common ancestor but are not excluded from being a template node if they do not have the common ancestor.

Block 104C then concludes in block 122C with identifying fourth record(s) in the target dimension using key value(s) from the second record(s) or the third record(s). The fourth record(s) identified from the sub-process of blocks 108C, 112C, and 118C, 120C, and 122C are identified for use as candidate connections from the first record to the target dimension.

In block 128C, after identifying the fourth record(s) in block 122C, example process 100C continues with updating the fourth record(s) to reference the first record using a key value of the first record. In block 132C, the first record is updated to reference the fourth record(s) using key values of the fourth record(s). The first record may be updated once, with multiple references to target dimensions updated at the same time, or multiple times, with different references to different target dimensions updated each time. Although FIG. 1C shows an example with one target dimension, more complex examples exist with multiple target dimensions, using the AI-driven process to find a template node for each of the target dimensions and connect the first record to the multiple target dimensions using the template nodes.

Once the fourth record(s) have been updated in block 128C, block 134C includes receiving a request from a first application for information from the fourth record(s), and providing information about the first record(s) in response to the request. Other applications may also request data from other records and receive the updated information for incorporation into domain-specific application functionality such as predictions, forecasting, data analysis, process management, etc. Application(s) using data structures in the source domain may also use the updated information about other dimension(s) to respond to requests. In block 138C, a request is received from another application for information from the first record(s), and the other application provides information about the fourth record(s) in response to the request.

In various embodiments, a selected template record may have multiple matching connections to a target dimension by referencing different key values of different data structures in the target dimension. For example, the template record may reference roll-up structures in the target dimension as well as other structures in the target dimension. In these embodiments, key values used to reference these structures in the target dimension may be retrieved from the template record and used to establish connections to the target dimension for the updated or changed record in the source dimension. The records corresponding to the key values in the target dimension may be updated to reference key value(s) of the changed record(s) in the source dimension, as well as the changed record(s) in the source dimension being updated to reference key value(s) of the structure(s), possibly including roll-up structure(s), in the target dimension.

Figure 2C:
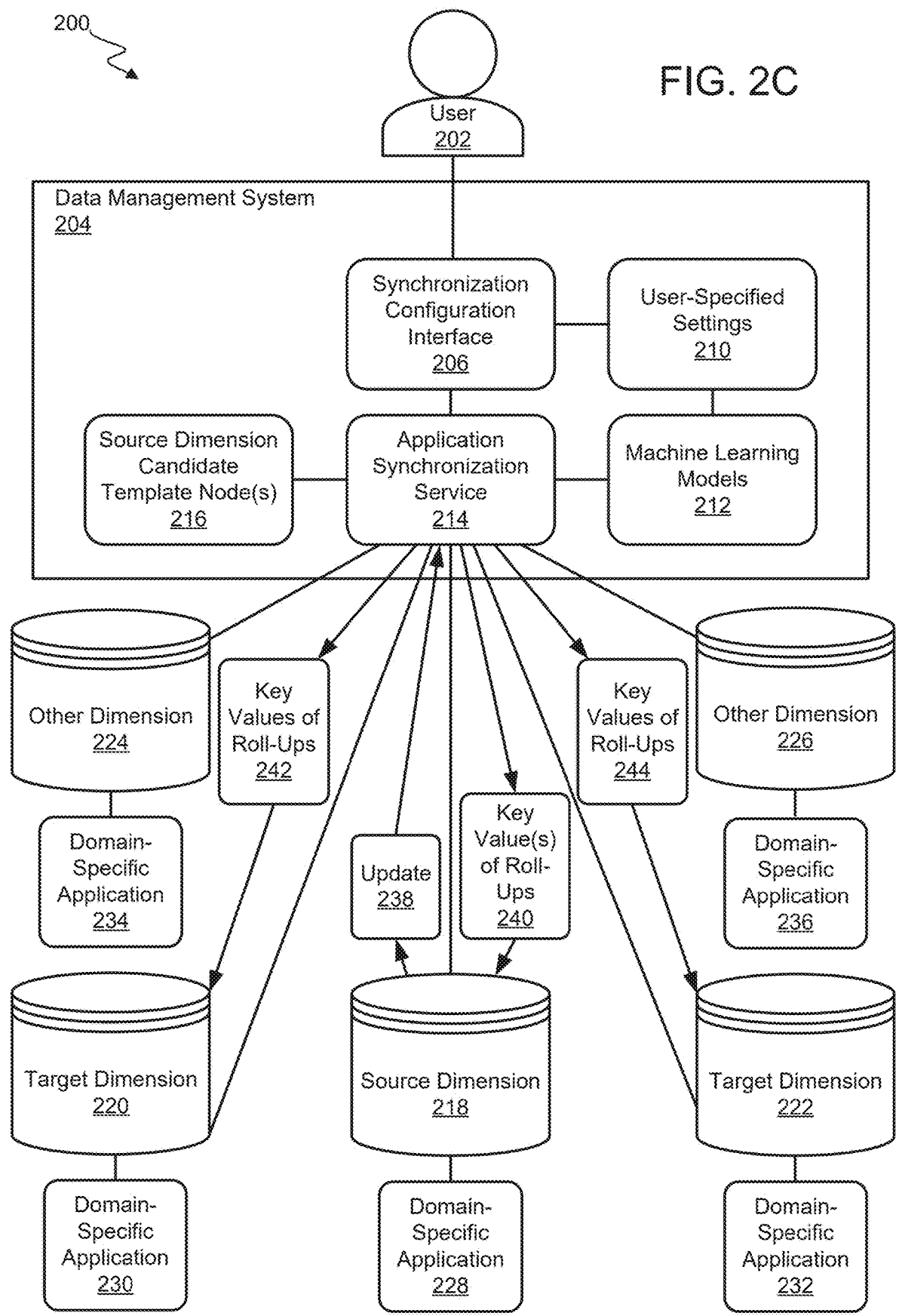
FIG. 2C illustrates a system diagram showing an example data management system that uses an AI-driven process that identifies template record(s) from existing records in a source dimension for modeling change(s) to connection(s) with target dimension(s) based on updated record(s) in the source dimension.

FIG. 2C illustrates a system diagram showing an example system 200 that uses an AI-driven process that identifies template record(s) from existing records in a source dimension for modeling change(s) to connection(s) with target dimension(s) based on updated record(s) in the source dimension. For example, the template record(s) may be used to determine what changes are needed in a target dimension, including roll-up structures in the target dimension, when a value and/or roll-up structures based on the value are changed in the source dimension. User 202 interacts with synchronization configuration interface 206 of data management system 204 to configure user-specified settings 210. Application synchronization service 214 uses user-specified settings 210 to apply changes to target dimensions 220 and 222 based on an update 238 from source dimension 218. The changes to propagate are determined using source dimension candidate template node(s) 216, which may be determined by application synchronization service 214 using user-specified settings 210 according to an AI-driven process. The changes are applied by sending key value(s) 242 and 244 of the updated source dimension record and/or roll-up structures in the source dimension dependent on the updated source dimension record to target dimensions 220 and 222 for changing any number of target records or roll-up structures in the target dimension, and the key value(s) 240 of the corresponding target dimension record(s) and/or roll-up structures in the target dimension that are changed, based on the template record, to source dimension 218 for updating any number of records that are impacted by the changed records in the target dimension. Other dimensions 224 and 226 not referenced by the source dimension 218 or the updated data may remain unchanged by the update, while target dimensions 220 and 222, as well as source dimension 218, are changed by the update. Domain-specific applications 228, 230, and 232 may use dimensional data that reflects the updates, and domain-specific applications 234 and 236 may continue to interact with other dimensions unimpacted by the changes.

Figure 3C:
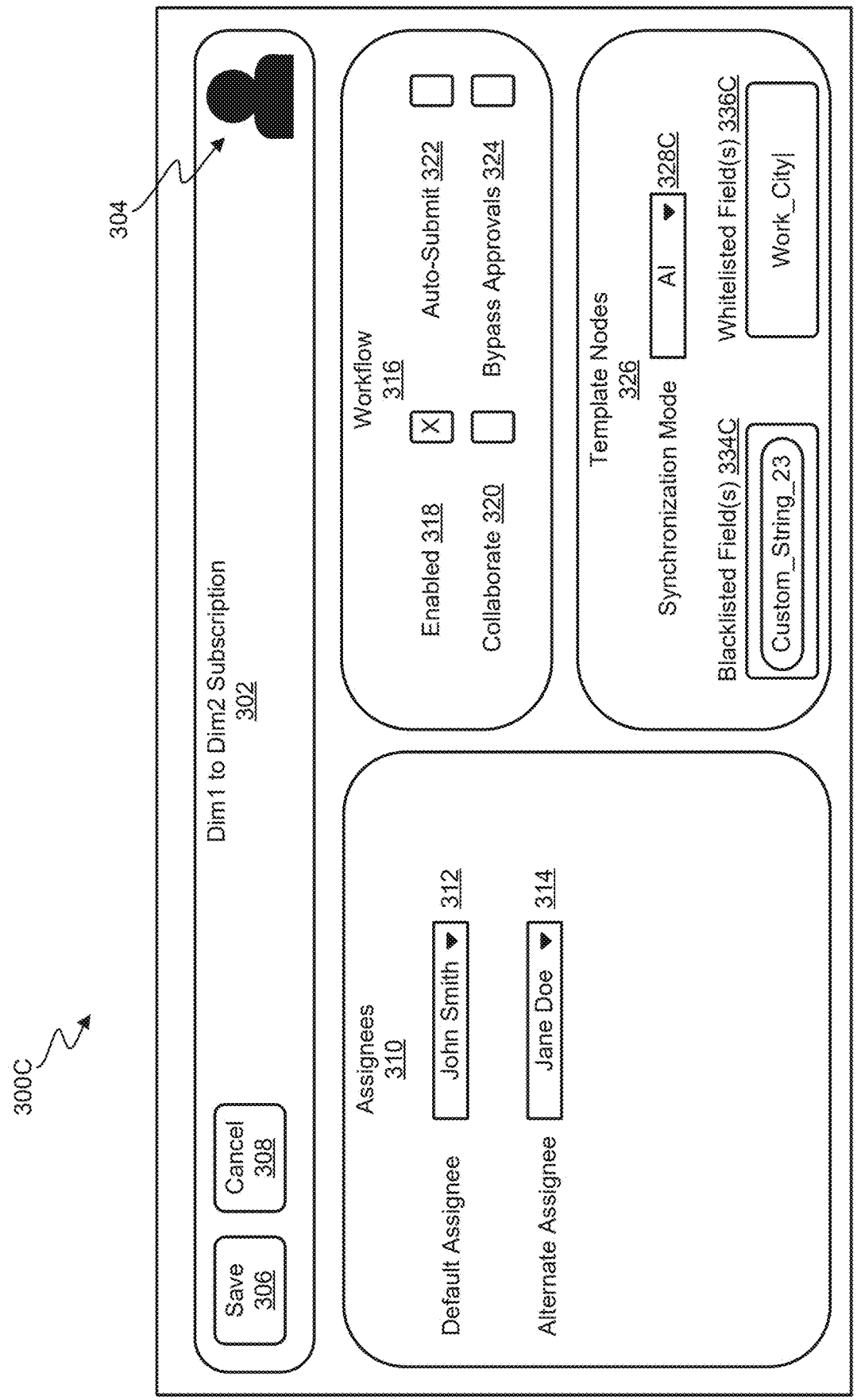
FIG. 3C illustrates a diagram of an example user interface showing a configuration of an example AI-driven process that identifies template record(s) from existing records in a source dimension for modeling change(s) to connection(s) with a target dimension based on update record(s) in the source dimension.

FIG. 3C illustrates a diagram of an example user interface 300C showing a configuration of an example AI-driven process that identifies template record(s) from existing records in a source dimension for modeling change(s) to connection(s) with a target dimension based on update record(s) in the source dimension and/or roll-up structure(s) in the source dimension based on the updated record(s). As shown, a header 302 describes that the interface is for a Dim1 to Dim2 subscription or setting, where Dim1 is a source dimension and Dim2 is a target dimension. The interface may have user-specific information depending on which user is logged into the system and which dimensions the user has access to view and/or modify. The user logged into the system is indicated by a user icon 304 identifying the user. Interface 300C may also have options to save 306 or cancel 308 changes made to the dimension-to-dimension subscription being modified. As shown, assignments of template nodes and, ultimately, assignments of connections to target dimensions are reviewable by user-specified users, called assignees in assignees section 310. A default assignee 312 is specified as John Smith, a user who receives recommended mappings to the target dimension as records in the source dimension are added or updated. An alternate assignee 314 is specified as Jane Doe, a user who may receive a notification of the recommended mappings that have not yet been confirmed, rejected, or otherwise reviewed by the default assignee, for example, after a period of time has passed.

Interface 300C also includes workflow options 316. The enabled option 318 is selected to indicate that the dimension-to-dimension setting or subscription is active for live updates between the source dimension and the target dimension. If the enabled option 318 were unselected, the setting would be skipped as live updates are made to the source dimension. The collaborate option 320 is unselected, indicating that the setting is owned and managed by user 304 without inclusion of other users. If the collaborate option 320 was selected, user 304 may specify which other users are allowed to modify the dimension-to-dimension setting. Auto-submit option 322 is unselected, indicating that recommendations from the setting should not be automatically applied to the target dimension. If the auto-submit option 322 were selected, recommendations for the setting would be automatically applied to the target dimension. Bypass approvals option 324 is unselected, indicating that the default assignees are presented with the connections that were made or are to be made by the system. If bypass approvals option 324 were selected, notifications to assignees may be paused for updates made by the data management system.

Interface 300C also includes settings for template nodes 326, which include an option 328C to select a synchronization mode from rules-driven, AI-driven, or hybrid. As shown, an AI-driven process is selected to cause the setting to use AI to find a template node. Also as shown, blacklisted field(s) 334C may be specified, and whitelisted field(s) 336C may be specified, to guide the selected process to finding a template node for connecting to the target dimension as described herein.

In one embodiment, the vector embeddings include one or more values associated with roll-up structures connected to the record for which the vector embedding is being determined. The vector embeddings may concatenate values that connect the record to the roll-up structures such as the name of the roll-up value on which records are being aggregated as well as other fields associated with the record. The vector embeddings may also include other characteristics such as a record creation date, a record modification date, and/or an indication of which user created the record. Any such features of the vector embeddings may be used to find a matching template node.

When generating vector embeddings and/or when determining distances between vector embeddings, certain fields may be weighted higher than other fields, causing a higher scaled distance when these fields are different and a lower scaled distance when these fields are similar. In one embodiment, the first user-specified setting includes preferred matching field(s) that are not required but that have an increased weight with respect to other fields. The fourth record(s) may be identified for use as the candidate connection to the target dimension based at least in part on an increased weight of the preferred matching field(s).

In the same or a different embodiment, the first user-specified setting indicates a preferred common ancestry, such as a preference that the template record share a same parent or grandparent record, that is not required but that results in increased weight for matching records. The fourth record(s) may be identified for use as the candidate connection to the target dimension based at least in part on an increased weight of a subset of records sharing the preferred common ancestry. The subset of records receiving the preferred weighting may be all records for which distances were calculated or only a subset of records for which distances were calculated.

In one embodiment, the vector embeddings of existing records are clustered so that a single distance may be determined between similar existing records and the first record, without determining a distance between the first record and all existing records. For example, the clustering may group together the subset of records having a same connection to the target dimension. Aggregate vector embedding may be determined for each of the clusters, and a distance may be determined between the first record and the aggregate embedding(s). For example, the aggregate vector embedding may include a mean, median, maximum, or minimum value for each value represented by the vector embeddings of the records in the cluster.

Vector embeddings may exclude blacklisted field(s) and/or include whitelisted field(s) based on a blacklist and/or whitelist specified by the user. Different user specified settings for different mappings between dimensions may be linked to different whitelists and/or blacklists, such that different fields may be whitelisted or blacklisted specifically to certain dimension-to-dimension mappings or generically with respect to all or a subset of dimension-to-dimension mappings. In one example, based on a blacklisted specified for a user-specified setting, the data management system filters out, from the source dimension, field(s) that are on the blacklist, and/or filters in, from the source dimension, field(s) that are on the whitelist. The vector embeddings may then be generated, both for the new or changed record(s) and for the existing record(s) to compare with the new or changed record(s), based on fields other than the blacklisted field(s) and/or based on fields including only the whitelisted field(s).

A blacklist preference may be specified without adding specific fields to the blacklist but by identifying a type of field that should be blacklisted if that type of field exists. Such a restriction may be applied generically with respect to dimension-to-dimension mappings or specific to a given mapping. For example, a user-specified setting may be subject to an option to exclude fields that have a protected class of information, such as race, gender, or sexual orientation. Based on this setting, the data management server may filter, from the source domain, any field(s) predicted to have a protected class of information. The vector embeddings for distance comparison may be generated based on fields other than the excluded field(s) after the filtering. Such restrictions may help to ensure that race, gender, sexual orientation, or other biases are not reinforced by the data management system.

As with the rules-driven process, the AI-driven process may include options for automatically applying recommended connections, for triggering manual review of recommended connections before they are automatically applied, and/or for automatically applying recommended connections with an option to roll back incorrect connections via a triggered manual review. The review may be triggered for the data upload user or the data reviewing user, which may be the same or different users. Different dimension mapping recommendations may be routed to different users for review, depending on subject matter expertise of the users. Such routings may be specified in the dimension-to-dimension user-specified settings or rules, for example.

In one embodiment, nodes of the source domain that are considered as candidate template nodes may be restricted to those nodes that share a same parent, are in a same section of a node hierarchy, or have a same grandparent, great grandparent, or other common ancestor or ancestor characteristic as the new or updated node. In another embodiment, the node ancestry restrictions may be soft restrictions that are used to rank nodes with a preferred ancestry higher than nodes that do not have the preferred ancestry for use as the template node.

The incoming node may be used to semantically search for other nodes that are similar to the incoming node and that have already been connected to the target dimension, without limiting the semantic search to a selected few fields that can be matched. The semantic search may find a template node or cluster of candidate template nodes for which there is little or no exactly matched fields between the new or updated node and the template node or cluster of candidate template nodes, as long as the template node or cluster of candidate template nodes matches better than other candidate template nodes or other clusters of candidate template nodes. If the cluster of candidate template node(s) shares the same connections to the target dimension, the connections may be used with or without selecting a closest neighbor or template node from the cluster. If there are differences in the connections within the cluster, a closest neighbor or template node may be selected from the cluster. For example, a preference may be made on a most or least recently created or modified node that shares a same parent as the new or updated node.

The trained machine learning model may then be applied to new nodes or updated nodes in the source dimension to predict connections that should exist for those nodes in the target dimension. A vector embedding is generated for the new or updated node in the source dimension, and the vector embedding is fed into the trained model. The trained model may be used to determine a distance between the vector embedding and other vector embeddings of existing nodes, such as an aggregate vector embedding of a closest cluster of vector embeddings that have a connection with the target dimension. For example, an "East" cluster is based on vector embeddings of nodes from the source dimension that have been connected to the target dimension as members of the "East" dataset, and a "West" cluster is based on vector embeddings of nodes from the source dimension that have been connected to the target dimension as members of the "West" dataset. The connection(s) corresponding to the cluster represented by the most closely matching aggregate vector embedding may be used as the predicted connection(s) for the new or updated node in the source dimension.

The predicted connection(s) may be fewer than the existing connection(s), different than the existing connection(s) but in the same number, or more than the existing connection(s). For example, a new node may have no existing connections but is predicted to have one or more connections with the target dimension. As another example, an updated node may be updated to change an address of an employee, which may change a roll-up region assigned in the target dimension from "West" to "East," for example. As yet another example, an update to the source dimension may cause the node to drop off of a list in the target dimension. For example, the list may track divisions that have reached or exceeded a budget for a time period, and the update in the source dimension may be due to an increased budget for a division or a reset in the time period (e.g., the end of a quarter or fiscal year).

In one embodiment, a synchronization user interface includes an option to select a rules-driven option or an AI-driven option for synchronizing records between different dimensions. If the AI-driven option is selected, the synchronization user interface may provide further options to guide the AI-driven synchronization, such as fields preferred (to be more highly weighted in the vector embeddings) to use for guiding selection of a template node, fields required to match before proceeding with AI-driven selection from among matching nodes, fields allowed to be used in the vector embeddings for finding a closest existing node for use as a template node, field disallowed from use in vector embeddings for finding a closest existing node for use as a template node, whether a template node must have a same parent, grandparent, great grandparent, or other ancestor as the new or updated node, whether AI-driven synchronization should be performed alone or in combination with rules-driven synchronization, etc. In one embodiment, the AI-driven option, once selected, does not require any additional selections to be made in order for the AI-driven option to be applied for finding a template node to establish connections between the selected dimensions. Once the source dimension and target dimension have been established and the AI-driven option is enabled, additional configurations may be optional, and default configurations may take effect to use vector embeddings to find template nodes when nodes are added or updated to the first dimension. In one embodiment, the AI-driven synchronization user interface includes an option for eliminating bias in the selection of a template node. The option to eliminate bias may exclude, from consideration for finding a template node, fields that describe protected classes, such as gender, race, or sexual orientation, and allow fields that do not describe protected classes, such as job title, work city, and years at the company. For example, fields that have data matching common, stored patterns of protected class data may be excluded. Such patterns may be stored as regular expressions of data that qualifies as protected class information.

Hybrid Synchronization

FIG. 2A illustrates a system diagram showing an example system 200 that uses a rules-driven process, an AI-driven process, or a hybrid process that identifies template record(s) from existing records in a source dimension for modeling change(s) to connection(s) with target dimension(s) based on updated record(s) in the source dimension. For example, the template record(s) may be used to determine what changes are needed in a target dimension, including roll-up structures in the target dimension, when a value and/or roll-up structures based on the value are changed in the source dimension. User 202 interacts with synchronization configuration interface 206 of data management system 204 to configure user-specified rules 208 and user-specified settings 210. Application synchronization service 214 uses user-specified rules 208 and/or user-specified settings 210 to apply changes to target dimensions 220 and 222 based on an update 238 from source dimension 218. The changes are determined using source dimension candidate template node(s) 216, which may be determined by application synchronization service 214 using user-specified rules 208 and/or user-specified settings 210 according to a hybrid process. The changes to propagate are applied by sending key value(s) 242 and 244 of the updated source dimension and/or roll-up structures in the source dimension dependent on the updated source dimension record to target dimensions 220 and 222 for changing any number of target records or roll-up structures in the target dimension, and the key value(s) 240 of the corresponding target dimension record(s) and/or roll-up structures in the target dimension that are changed, based on the template record, to source dimension 218 for updating any number of records that are impacted by the changed records in the target dimension. Other dimensions 224 and 226 not referenced by the source dimension 218 or the updated data may remain unchanged by the update, while target dimensions 220 and 222, as well as source dimension 218, are changed by the update. Domain-specific applications 228, 230, and 232 may use dimensional data that reflects the updates, and domain-specific applications 234 and 236 may continue to interact with other dimensions unimpacted by the changes.

In various embodiments, a selected template record may have multiple matching connections to a target dimension by referencing different key values of different data structures in the target dimension. For example, the template record may reference roll-up structures in the target dimension as well as other structures in the target dimension. In these embodiments, key values used to reference these structures in the target dimension may be retrieved from the template record and used to establish connections to the target dimension for the updated or changed record in the source dimension. The records corresponding to the key values in the target dimension may be updated to reference key value(s) of the changed record(s) in the source dimension, as well as the changed record(s) in the source dimension being updated to reference key value(s) of the structure(s), possibly including roll-up structure(s), in the target dimension.

FIG. 3A illustrates a diagram of an example user interface 300A showing a configuration of an example hybrid process that identifies template record(s) from existing records in a source dimension for modeling change(s) to connection(s) with a target dimension based on update record(s) in the source dimension and/or roll-up structure(s) in the source dimension based on the updated record(s). As shown, a header 302 describes that the interface is for a Dim1 to Dim2 subscription or setting, where Dim1 is a source dimension and Dim2 is a target dimension. The interface may have user-specific information depending on which user is logged into the system and which dimensions the user has access to view and/or modify. The user logged into the system is indicated by a user icon 304 identifying the user. Interface 300A may also have options to save 306 or cancel 308 changes made to the dimension-to-dimension subscription being modified. As shown, assignments of template nodes and, ultimately, assignments of connections to target dimensions are reviewable by user-specified users, called assignees in assignees section 310. A default assignee 312 is specified as John Smith, a user who receives recommended mappings to the target dimension as records in the source dimension are added or updated. An alternate assignee 314 is specified as Jane Doe, a user who may receive a notification of the recommended mappings that have not yet been confirmed, rejected, or otherwise reviewed by the default assignee, for example, after a period of time has passed.

Interface 300A also includes workflow options 316. The enabled option 318 is selected to indicate that the dimension-to-dimension setting or subscription is active for live updates between the source dimension and the target dimension. If the enabled option 318 were unselected, the setting would be skipped as live updates are made to the source dimension. The collaborate option 320 is unselected, indicating that the setting is owned and managed by user 304 without inclusion of other users. If the collaborate option 320 was selected, user 304 may specify which other users are allowed to modify the dimension-to-dimension setting. Auto-submit option 322 is unselected, indicating that recommendations from the setting should not be automatically applied to the target dimension. If the auto-submit option 322 were selected, recommendations for the setting would be automatically applied to the target dimension. Bypass approvals option 324 is unselected, indicating that the default assignees are presented with the connections that were made or are to be made by the system. If bypass approvals option 324 were selected, notifications to assignees may be paused for updates made by the data management system.

Interface 300A also includes settings for template nodes 326, which include an option 328A to select a synchronization mode from rules-driven, AI-driven, or hybrid. As shown, a hybrid process is selected to cause the setting to use both a rules-driven process and an AI-driven process. Also as shown, required field(s) 330A may be specified, and preferred field(s) 332A may be specified, to guide the selected process to finding a template node for connecting to the target dimension as described herein.

In one embodiment, a rule-driven synchronization is used in combination with an AI-driven synchronization. The rule-driven synchronization may be used as a first-pass attempt to find a closest existing node for a new node or a node that has changed. If certain field(s) specified by a rule match an existing node exactly, the existing node may be selected as a template node. Connections from the template node may be used to establish, adjust, or re-establish connections for the new or updated node.

If the certain field(s) specified by the rule match more than one node exactly, or if the certain field(s) specified by the rule do not match any nodes, an AI-driven synchronization approach may be used in a second pass to identify a closest neighbor node to use as a template node. The AI-driven approach may look at a broader set of similarities between the new or updated node and the existing candidate neighbor nodes based on vector embeddings of the existing nodes or of clusters to which the existing nodes have been assigned. The AI-driven approach may be further restricted to those existing nodes that share a same parent, are in a same section of a node hierarchy, or have a same grandparent, great grandparent, or other common ancestor or ancestor characteristic as the new or updated node. In another embodiment, the node ancestry restrictions may be soft restrictions that are used to rank nodes with a preferred ancestry higher than nodes that do not have the preferred ancestry for use as the template node.

In this serial hybrid approach, the AI-driven process may be performed after records have already been filtered out as not containing required fields. In this example, the user-specified setting or rule may include required matching field(s) in addition to an indication that automatic template record selection should be performed. If more than one record matches the required matching field(s), the AI-driven process may be used to narrow down the matching records to those records that are closest to the vector embedding of the changed record. The closest record may be selected as the template record.

The AI-driven process may also be restricted on specific fields. Some fields may be required, by the rules to match exactly, while other fields may be "preferred" to match but not required to match. When no nodes match the preferred fields but many nodes match the required fields, the AI-driven approach may be used to match vector embeddings of the new or updated node to the vector embeddings of existing nodes or of clusters to which existing nodes have been assigned.

In one embodiment, rather than using a first-pass and second-pass approach, the rule-driven synchronization may be performed in parallel with the AI-driven synchronization to select a first template node based on the rule-driven synchronization and a second template node based on the AI-driven synchronization. If the first template node and the second template node match, the matched template node may be used as the template node for the new or updated node. If the first template node and the second template node do not match, artificial intelligence may be further used to score the selections by each of the synchronization approaches. For example, the selections may be scored based on how accurately the selections align with the existing data from the source dimension that has been connected to the target dimension. If the rules-driven approach suggests a connection to the target dimension that is only present in 60% of the nodes for which the rule should apply, for example, but the AI-driven approach suggests a connection to the target dimension that is present in 80% of the nodes that match certain fields of the vector embeddings, then the AI-driven approach may be selected over the rules-driven approach. On the other hand, if the rules-driven approach suggests a connection to the target dimension that is present in 99% of the nodes for which the rule should apply, for example, and the AI-driven approach suggests a connection to the target dimension that is present in 80% of the nodes that match certain fields of the vector embeddings, then the rules-driven approach may be selected over the AI-driven approach.

If a rule-driven process and AI-driven process are both being used to generate recommendations, the data management system may generate such recommendations using techniques described herein for the rule-driven process and the AI-driven process, resulting in a candidate template node that would cause a candidate mapping to a target dimension. If the processes recommend the same candidate mapping and/or same candidate template node, the candidate mapping and/or candidate template node may be used to complete the synchronization process without selecting between the rule-driven process or the AI-driven process. The processes drive the same result and are both selected in this example. If the processes make different recommendations, the recommendations may be scored using accuracy scores of the rules-driven process being used (as defined by the corresponding user-specified rule) and of the AI-driven process being used (as defined by the corresponding user-specified setting). The accuracy scores may indicate how accurately the processes align with existing data mapped to the target dimension. For example, if the existing data would be mapped more consistently with actual mappings from that existing data to the target dimension based on one process over the other, the rule generating the mapping more consistent with actual data may receive a higher score. Based on the accuracy scores, a candidate mapping and/or candidate template node may be selected from one of the processes over the other. The selected candidate mapping and/or template node may be used to complete the connection to the target dimension. In one embodiment, when the processes disagree on the recommendation, the data management system may cause display, to the data upload user and/or the data reviewing user, of information about the non-selected mapping (non-mapped record in the target domain) and/or template node in association with a recommendation to connect the first record using the selected mapping (mapped record in the target domain) and/or template node.

Feedback may also be taken into account when determining which template node to use from the different available approaches. If the rules-driven approach is often rejected in scenarios with certain vector embeddings involved, then the AI-driven approach may be selected over the rules-driven approach in these scenarios. Similarly, if the AI-driven approach is often rejected in scenarios with certain rules being matched, then the rules-driven approach may be selected over the AI-driven approach in these scenarios. Conversely, if the rules-driven approach is often accepted in scenarios with certain vector embeddings involved, then the rules-driven approach may be selected over the AI-driven approach in these scenarios. Similarly, if the AI-driven approach is often accepted in scenarios with certain rules being matched, then the AI-driven approach may be selected over the rules-driven approach in these scenarios.

In one embodiment, if the approaches lead to different recommendations of different template nodes that would lead to different connections, the data management system may display a warning explaining why the selected template node was selected and why the non-selected template node was not selected, as well as optionally the differing outcomes of possibly selecting the non-selected template node over the selected template node. For example, although a rules-driven approach may have an exact field match, resulting in a recommended template node, an AI-driven approach may determine that, for other nodes with similar location-related features, a different location connection is often selected for the location dimension. In a particular example, a coarse-grained rule may apply the same location to all employees with a same manager, but a manager may have her or his first employee from a different region added to a first dimension. The data management system may determine that employees in different locations typically receive connections to the location dimension based on their work city and that this particular employee is not receiving a connection based on her or his work city but instead based on her or his manager.

Accordingly, the data management system may display a warning notifying a data management user that the employee is about to be added to a location dimension that typically would not be selected for similar employees with similar location data, and the data management user may confirm or reject the recommended connection to the location dimension and, if rejected, optionally override the connection with the different connection that was recommended by the AI-driven approach.

Computer System Architecture

Figure 4:
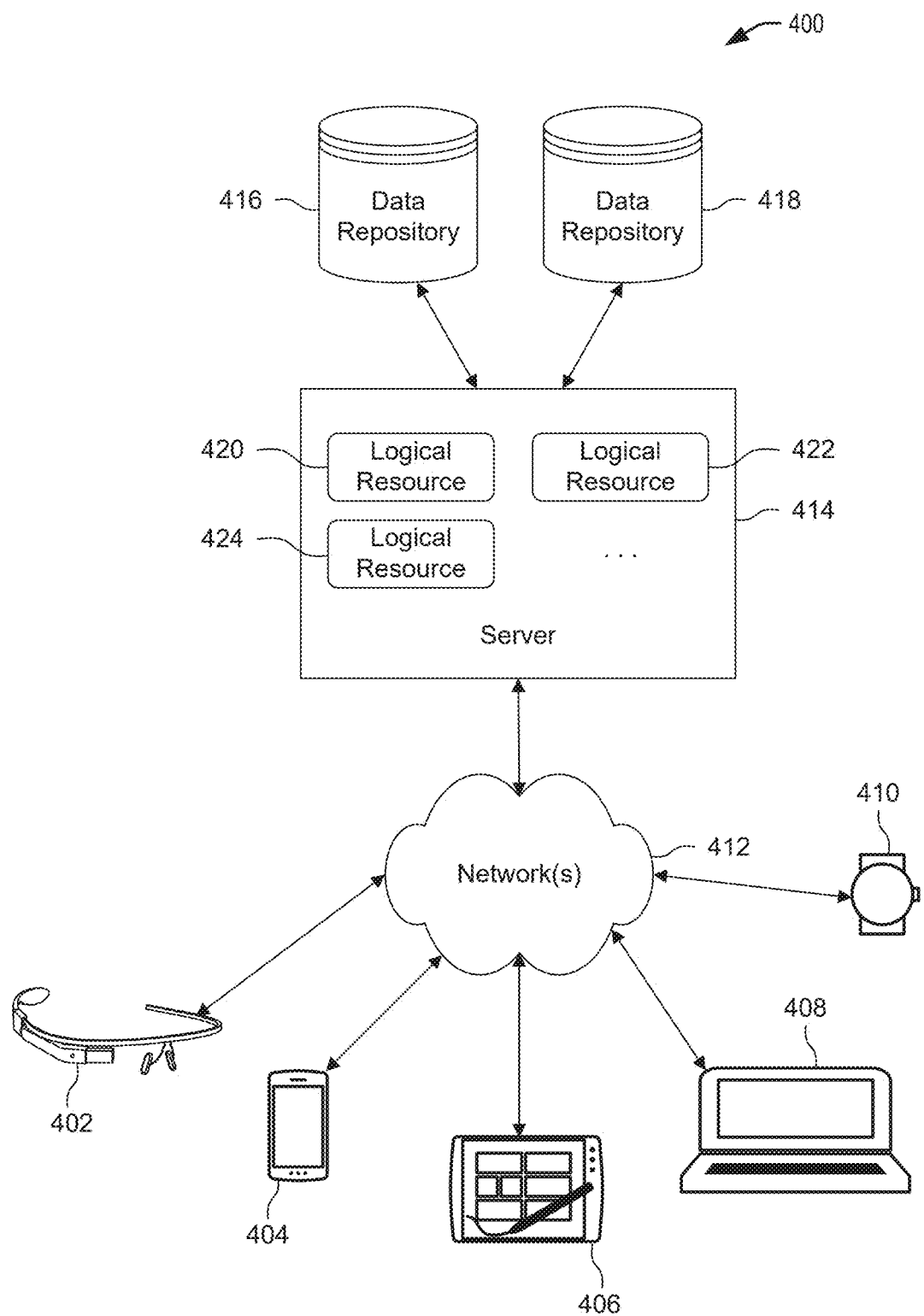
FIG. 4 depicts a simplified diagram of a distributed system for implementing certain aspects.

FIG. 4 depicts a simplified diagram of a distributed system 400 for implementing an embodiment. In the illustrated embodiment, distributed system 400 includes one or more client computing devices 402, 404, 406, 408, and/or 410 coupled to a server 414 via one or more communication networks 412. Clients computing devices 402, 404, 406, 408, and/or 410 may be configured to execute one or more applications.

In various aspects, server 414 may be adapted to run one or more services or software applications that enable techniques for identifying template record(s) from existing records for modeling change(s) to connection(s) with target dimension(s).

In certain aspects, server 414 may also provide other services or software applications that can include non-virtual and virtual environments. In some aspects, these services may be offered as web-based or cloud services, such as under a Software as a Service (SaaS) model to the users of client computing devices 402, 404, 406, 408, and/or 410. Users operating client computing devices 402, 404, 406, 408, and/or 410 may in turn utilize one or more client applications to interact with server 414 to utilize the services provided by these components.

In the configuration depicted in FIG. 4, server 414 may include one or more components 420, 422 and 424 that implement the functions performed by server 414. These components may include software components that may be executed by one or more processors, hardware components, or combinations thereof. It should be appreciated that various different system configurations are possible, which may be different from distributed system 400. The embodiment shown in FIG. 4 is thus one example of a distributed system for implementing an embodiment system and is not intended to be limiting.

Users may use client computing devices 402, 404, 406, 408, and/or 410 for techniques for identifying template record(s) from existing records for modeling change(s) to connection(s) with target dimension(s) in accordance with the teachings of this disclosure. A client device may provide an interface that enables a user of the client device to interact with the client device. The client device may also output information to the user via this interface. Although FIG. 4 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 412 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 412 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 414 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 414 can include one or more virtual machines running virtual operating systems, or other computing architectures involving virtualization such as one or more flexible pools of logical storage devices that can be virtualized to maintain virtual storage devices for the server. In various aspects, server 414 may be adapted to run one or more services or software applications that provide the functionality described in the foregoing disclosure.

The computing systems in server 414 may run one or more operating systems including any of those discussed above, as well as any commercially available server operating system. Server 414 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 414 may include one or more applications to analyze and consolidate data feeds and/or event updates received from users of client computing devices 402, 404, 406, 408, and/or 410. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 414 may also include one or more applications to display the data feeds and/or real-time events via one or more display devices of client computing devices 402, 404, 406, 408, and/or 410.

Distributed system 400 may also include one or more data repositories 416, 418. These data repositories may be used to store data and other information in certain aspects. For example, one or more of the data repositories 416, 418 may be used to store information for techniques for identifying template record(s) from existing records for modeling change(s) to connection(s) with target dimension(s). Data repositories 416, 418 may reside in a variety of locations. For example, a data repository used by server 414 may be local to server 414 or may be remote from server 414 and in communication with server 414 via a network-based or dedicated connection. Data repositories 416, 418 may be of different types. In certain aspects, a data repository used by server 414 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 416, 418 may also be used by applications to store application data. The data repositories used by applications may be of different types such as, for example, a key-value store repository, an object store repository, or a general storage repository supported by a file system.

In one embodiment, server 414 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 5:
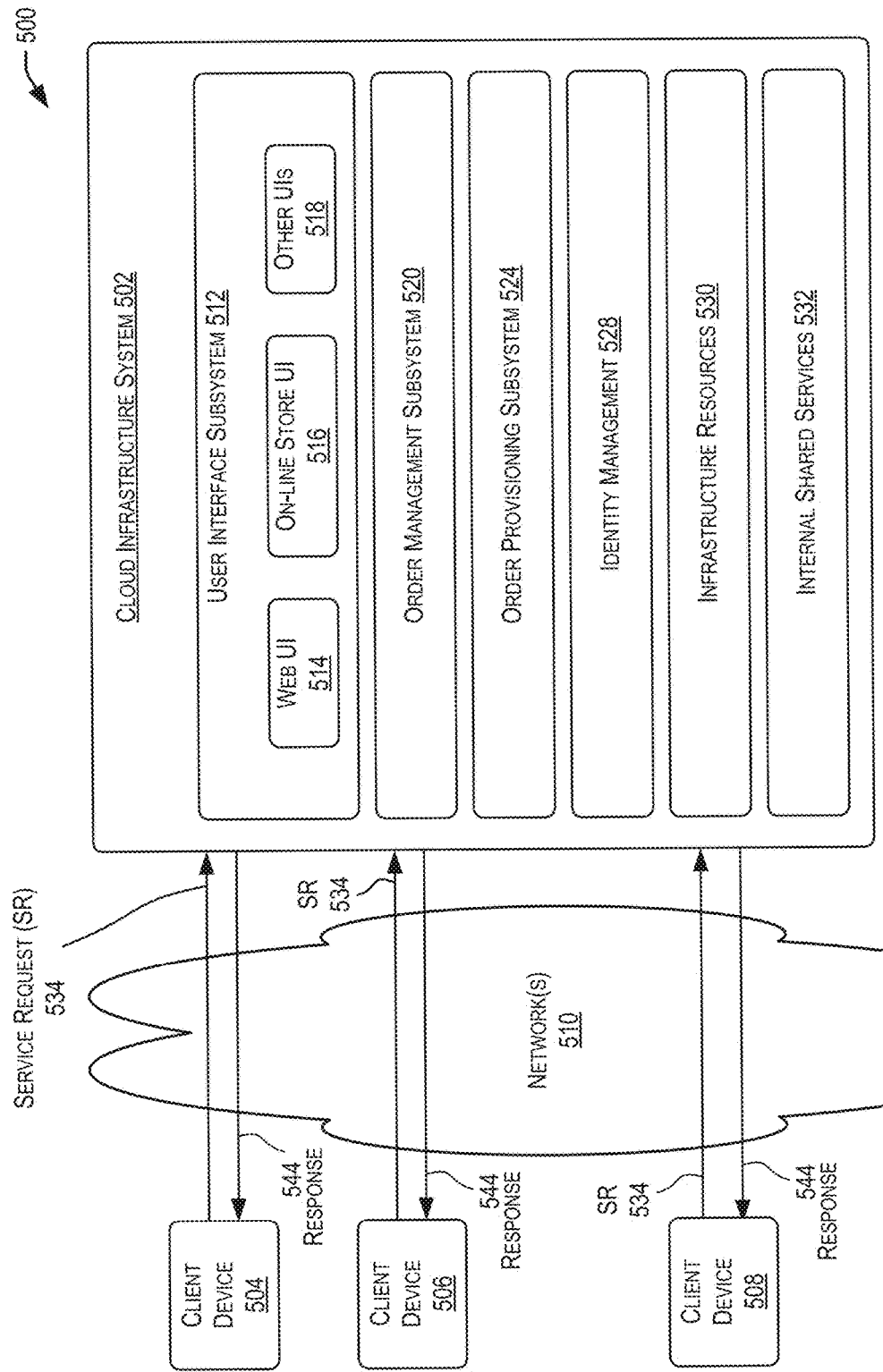
FIG. 5 is a simplified block diagram of one or more components of a system environment by which services provided by one or more components of an embodiment system may be offered as cloud services, in accordance with certain aspects.

FIG. 5 is a simplified block diagram of a cloud-based system environment in which template record(s) may be identified from existing records for modeling change(s) to connection(s) with target dimension(s), in accordance with certain aspects. In the embodiment depicted in FIG. 5, cloud infrastructure system 502 may provide one or more cloud services that may be requested by users using one or more client computing devices 504, 506, and 508. Cloud infrastructure system 502 may comprise one or more computers and/or servers that may include those described above for server 412. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The embodiment depicted in FIG. 5 is only one example of a cloud infrastructure system and is not intended to be limiting. It should be appreciated that, in some other aspects, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative aspects.

The term cloud service is generally used to refer to a service that is made available to users on demand and via a communication network such as the Internet by systems (e.g., cloud infrastructure system 502) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 510 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 502 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 502 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 502. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 502. Cloud infrastructure system 502 then performs processing to provide the services requested in the tenant's subscription order. Cloud infrastructure system 502 may be configured to provide one or even multiple cloud services.

Cloud infrastructure system 502 may provide the cloud services via different deployment models. In a public cloud model, cloud infrastructure system 502 may be owned by a third party cloud services provider and the cloud services are offered to any general public tenant, where the tenant can be an individual or an enterprise. In certain other aspects, under a private cloud model, cloud infrastructure system 502 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 502 and the services provided may be shared by several organizations in a related community. Various other models such as hybrids of the above mentioned models may also be used.

Client computing devices 504, 506, and 508 may be of different types (such as devices 402, 404, 406, and 408 depicted in FIG. 4) and may be capable of operating one or more client applications. A user may use a client device to interact with cloud infrastructure system 502, such as to request a service provided by cloud infrastructure system 502.

In some aspects, the processing performed by cloud infrastructure system 502 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 502 for determining the intent of an utterance. The data used for this analysis may include structured data (e.g., data stored in a database or structured according to a structured model) and/or unstructured data (e.g., data blobs (binary large objects)).

As depicted in the embodiment in FIG. 5, cloud infrastructure system 502 may include infrastructure resources 530 that are utilized for facilitating the provision of various cloud services offered by cloud infrastructure system 502. Infrastructure resources 530 may include, for example, processing resources, storage or memory resources, networking resources, and the like.

In certain aspects, to facilitate efficient provisioning of these resources for supporting the various cloud services provided by cloud infrastructure system 502 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provisioning of services by cloud infrastructure system 502. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 502 may comprise multiple subsystems. These subsystems may be implemented in software, or hardware, or combinations thereof. As depicted in FIG. 5, the subsystems may include a user interface subsystem 512 that enables users of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a tenant may, using a client device, request (service request 534) one or more services provided by cloud infrastructure system 502 using one or more of interfaces 514, 516, and 518. For example, a tenant may access the online store, browse cloud services offered by cloud infrastructure system 502, and place a subscription order for one or more services offered by cloud infrastructure system 502 that the tenant wishes to subscribe to. The service request may include information identifying the tenant and one or more services that the tenant desires to subscribe to.

In certain aspects, such as the embodiment depicted in FIG. 5, cloud infrastructure system 502 may comprise an order management subsystem (OMS) 520 that is configured to process the new order. As part of this processing, OMS 520 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 520 may then invoke the order provisioning subsystem (OPS) 524 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 502 may send a response or notification 544 to the requesting tenant to indicate when the requested service is now ready for use. In some instances, information (e.g., a link) may be sent to the tenant that enables the tenant to start using and availing the benefits of the requested services.

Cloud infrastructure system 502 may provide services to multiple tenants. For each tenant, cloud infrastructure system 502 is responsible for managing information related to one or more subscription orders received from the tenant, maintaining tenant data related to the orders, and providing the requested services to the tenant or clients of the tenant. Cloud infrastructure system 502 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 502 may provide services to multiple tenants in parallel. Cloud infrastructure system 502 may store information for these tenants, including possibly proprietary information. In certain aspects, cloud infrastructure system 502 comprises an identity management subsystem (IMS) 528 that is configured to manage tenant's information and provide the separation of the managed information such that information related to one tenant is not accessible by another tenant. IMS 528 may be configured to provide various security-related services such as identity services, such as information access management, authentication and authorization services, services for managing tenant identities and roles and related capabilities, and the like.

Figure 6:
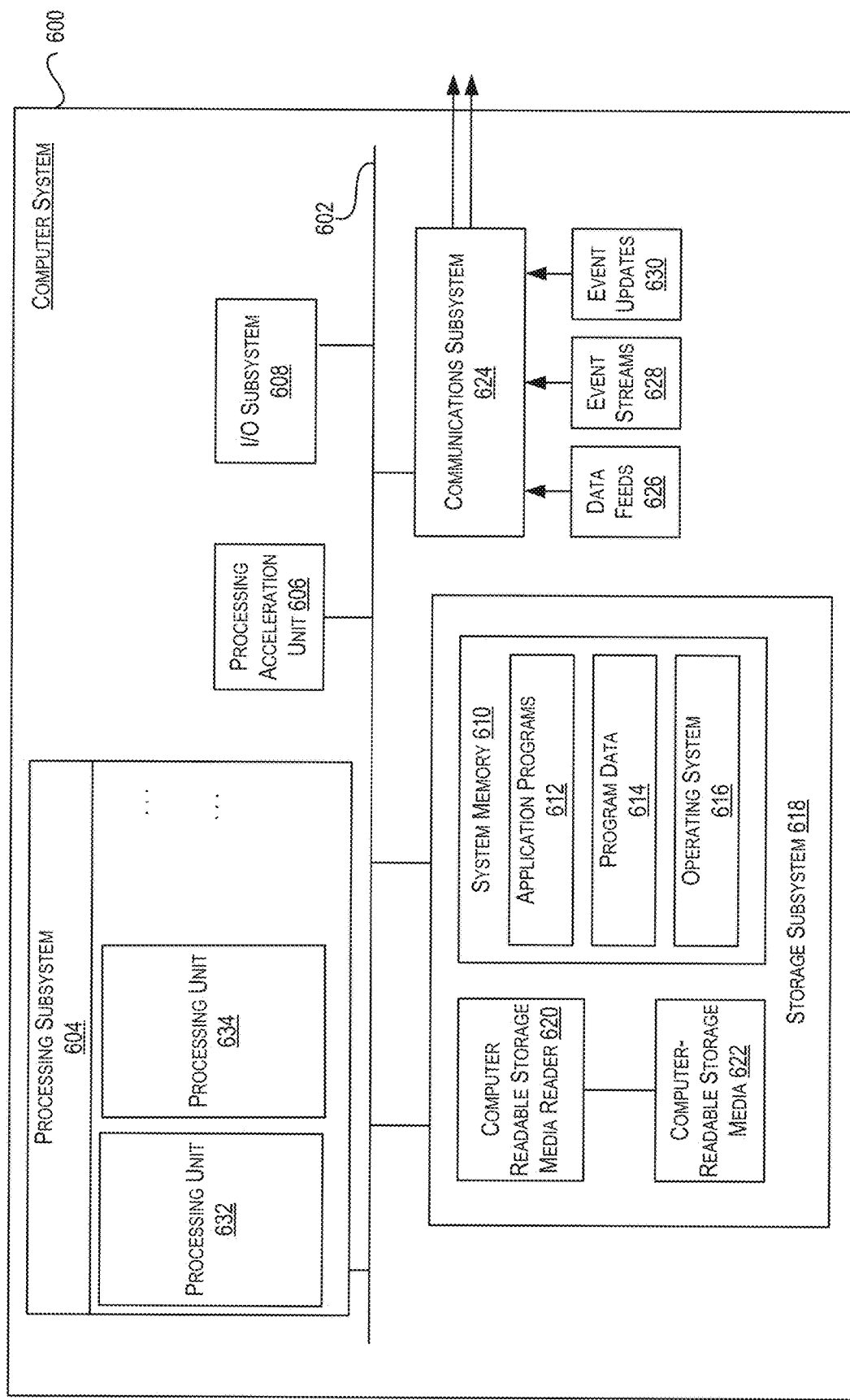
FIG. 6 illustrates an example computer system that may be used to implement certain aspects.

FIG. 6 illustrates an exemplary computer system 600 that may be used to implement certain aspects. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory computer-readable storage media including storage media 622 and a system memory 610.

Bus subsystem 602 provides a mechanism for letting the various components and subsystems of computer system 600 communicate with each other as intended. Although bus subsystem 602 is shown schematically as a single bus, alternative aspects of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processors, application specific integrated circuits (ASICs), or field programmable gate arrays (FPGAs). The processors may include be single core or multicore processors. The processing resources of computer system 600 can be organized into one or more processing units 632, 634, etc. A processing unit may include one or more processors, one or more cores from the same or different processors, a combination of cores and processors, or other combinations of cores and processors. In some aspects, processing subsystem 604 can include one or more special purpose co-processors such as graphics processors, digital signal processors (DSPs), or the like. In some aspects, some or all of the processing units of processing subsystem 604 can be implemented using customized circuits, such as application specific integrated circuits (ASICs), or field programmable gate arrays (FPGAs).

In some aspects, the processing units in processing subsystem 604 can execute instructions stored in system memory 610 or on computer readable storage media 622. In various aspects, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above. In instances where computer system 600 is executing one or more virtual machines, one or more processing units may be allocated to each virtual machine.

In certain aspects, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some aspects. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide a repository for storing data used in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 622 may store programming and data constructs that provide the functionality of some aspects. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, digital video disc (DVD), a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 618 may also include a computer-readable storage media reader 620 that can further be connected to computer-readable storage media 622. Reader 620 may receive and be configured to read data from a memory device such as a disk, a flash drive, etc.

In certain aspects, computer system 600 may support virtualization technologies, including but not limited to virtualization of processing and memory resources. For example, computer system 600 may provide support for executing one or more virtual machines. In certain aspects, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. For example, in certain aspects, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 624 can provide wired network connectivity (e.g., Ethernet) in addition to or instead of a wireless interface.

Communication subsystem 624 can receive and transmit data in various forms. For example, in some aspects, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
  receiving one or more updates to one or more records of a first set of data stored in one or more first database structures, wherein one or more other records of the first set of data reference one or more key values of a second set of data stored in one or more second database structures and one or more key values of a third set of data stored in one or more third database structures;
  for at least a first record, of the one or more records, identifiable in the first set of data using a first key value, identifying candidate connections from the first record to the second set of data and the third set of data at least in part by:
    accessing a first user-specified rule for connecting the first set of data to the second set of data, wherein the first user-specified rule comprises one or more matching fields of the first set of data;
    identifying a second record in the first set of data that:
      satisfies an ancestor condition at least in part by sharing a common ancestor with the first record, and
      matches the first record on the one or more matching fields;
    wherein the second record references a second key value of the second set of data;
    accessing a second user-specified rule for connecting the first set of data to the third set of data, wherein the second user-specified rule specifies one or more other matching fields of the first set of data;
    identifying a third record in the first set of data that:
      satisfies an ancestor condition at least in part by sharing a common ancestor with the first record, and
      matches the first record on the one or more other matching fields;
    wherein the third record references a third key value of the third set of data;
    identifying, for use as a first candidate connection from the first record to the second set of data, a fourth record in the second set of data using the second key value; and
    identifying, for use as a second candidate connection from the first record to the third set of data, a fifth record in the third set of data using the third key value;
  updating the fourth record to reference the first record using the first key value;
  updating the fifth record to reference the first record using the first key value;
  updating the first record in the first set of data to reference the fourth record using the second key value and the fifth record using the third key value;
  receiving a request from an application for information from the fourth record, and, in response to the request, providing information about the first record.

2. The computer-implemented method of claim 1, wherein the one or more matching fields are one or more required matching fields, the one or more other matching fields are one or more other required matching fields, the first user-specified rule also specifies one or more preferred fields, and the second user-specified rule also specifies one or more other preferred fields;
  wherein identifying the second record further comprises:
    assigning a first score to the second record based at least in part on whether the second record matches the one or more preferred fields, and selecting the second record from among a plurality of records of the first set of data based at least in part on the first score;
  wherein identifying the third record further comprises:
    assigning a second score to the third record based at least in part on whether the third record matches the one or more other preferred fields, and selecting the third record from among a plurality of records of the first set of data based at least in part on the second score.

3. The computer-implemented method of claim 1, wherein the first user-specified rule indicates that updates are to be automatically applied and the second user-specified rule indicates that updates are to be reviewed before being applied, wherein updating the fourth record and updating the first record are performed automatically in response to identifying the fourth record for use as the first candidate connection from the first record to the second set of data, without prompting a user for confirmation before updating the fourth record and updating the first record.

4. The computer-implemented method of claim 1, wherein the one or more updates are received from a first user, wherein the first user-specified rule indicates that updates are to be reviewed before being applied and the second user-specified rule indicates that updates are to be automatically applied, wherein updating the fourth record and updating the first record are performed after notifying a second user, according to the first user-specified rule, that the fourth record is proposed for use as the first candidate connection from the first record to the second set of data, and wherein updating the fourth record and updating the first record are performed in response to receiving user input from the second user confirming the fourth record is to be used as the first candidate connection from the first record to the second set of data.

5. The computer-implemented method of claim 1, wherein the one or more updates are received from a first user, wherein the first user-specified rule indicates that updates are to be reviewed by a second user before being applied and the second user-specified rule indicates that updates are to be reviewed by a third user before being applied, wherein updating the fourth record and updating the first record are performed after notifying the second user, according to the first user-specified rule, that the fourth record is proposed for use as the first candidate connection from the first record to the second set of data, and wherein updating the fourth record and updating the first record are performed in response to receiving user input from the second user confirming the fourth record is to be used as the first candidate connection from the first record to the second set of data; wherein updating the fifth record is performed after notifying the third user, according to the second user-specified rule, that the fifth record is proposed for use as the second candidate connection from the first record to the third set of data, and wherein updating the fifth record is performed in response to receiving user input from the third user confirming the fifth record is to be used as the second candidate connection from the first record to the third set of data.

6. The computer-implemented method of claim 1, wherein, for at least a sixth record of the one or more records in the first set of data:
  accessing a third user-specified rule for connecting the first set of data to a fourth set of data, wherein the third user-specified rule specifies one or more third matching fields of the first set of data;
  searching for a record in the first set of data that:
    satisfies an ancestor condition at least in part by sharing a common ancestor with the sixth record, and
    matches the sixth record on the one or more third matching fields;
  in response to failing to identify a record in the first set of data that satisfies an ancestor condition at least in part by sharing a common ancestor with the sixth record and that matches the sixth record on the one or more third matching fields, causing display of a notification that no matching record was found to connect the sixth record to the fourth set of data, wherein the notification comprises an option to select a template record or to select a value for connecting the sixth record to the fourth set of data without selecting the template record.

7. The computer-implemented method of claim 1, further comprising:
  causing display of a user interface for configuring the first user-specified rule;
  recommending, via an option on the user interface, a particular one or more fields to use as the one or more matching fields from the first set of data based at least in part on a similarity between a first range of the particular one or more fields and a second range of one or more fields in the second set of data.

8. The computer-implemented method of claim 1, further comprising:
  causing display of a user interface for configuring the first user-specified rule;
  recommending, via an option on the user interface, a particular one or more fields to use as the one or more matching fields from the first set of data based at least in part on a likelihood that existing records of the first set of data already connected to a same record of the second set of data already match on the particular one or more fields.

9. The computer-implemented method of claim 1, further comprising:
  causing display of a user interface for configuring the first user-specified rule;
  causing display, in the user interface, of a plurality of fields that may be used as the one or more matching fields from the first set of data, wherein the plurality of fields exclude one or more fields that have been blacklisted in a user-specified blacklist of fields that are not to be used as matching fields at least for matching to the second set of data.

10. The computer-implemented method of claim 1, wherein the second record references a fourth key value of a roll-up structure of the second set of data; the method further comprising:
  identifying, for use as a third candidate connection from the first record to the second set of data, a sixth record in the second set of data using the fourth key value; and
  updating the sixth record to reference the first record using the first key value;
  wherein updating the first record comprises updating the first record to reference the fourth key value.

11. A computer-program product comprising one or more non-transitory machine-readable storage media, including stored instructions configured to cause a computing system to perform a set of actions including:
  receiving one or more updates to one or more records of a first set of data stored in one or more first database structures, wherein one or more other records of the first set of data reference one or more key values of a second set of data stored in one or more second database structures and one or more key values of a third set of data stored in one or more third database structures;
  for at least a first record, of the one or more records, identifiable in the first set of data using a first key value, identifying candidate connections from the first record to the second set of data and the third set of data at least in part by:
    accessing a first user-specified rule for connecting the first set of data to the second set of data, wherein the first user-specified rule comprises one or more matching fields of the first set of data;
    identifying a second record in the first set of data that:
      satisfies an ancestor condition at least in part by sharing a common ancestor with the first record, and
      matches the first record on the one or more matching fields;
    wherein the second record references a second key value of the second set of data;
    accessing a second user-specified rule for connecting the first set of data to the third set of data, wherein the second user-specified rule specifies one or more other matching fields of the first set of data;
    identifying a third record in the first set of data that:
      satisfies an ancestor condition at least in part by sharing a common ancestor with the first record, and
      matches the first record on the one or more other matching fields;
    wherein the third record references a third key value of the third set of data;
    identifying, for use as a first candidate connection from the first record to the second set of data, a fourth record in the second set of data using the second key value; and
    identifying, for use as a second candidate connection from the first record to the third set of data, a fifth record in the third set of data using the third key value;
  updating the fourth record to reference the first record using the first key value;
  updating the fifth record to reference the first record using the first key value;
  updating the first record in the first set of data to reference the fourth record using the second key value and the fifth record using the third key value;
  receiving a request from an application for information from the fourth record, and, in response to the request, providing information about the first record.

12. The computer-program product of claim 11, wherein the one or more matching fields are one or more required matching fields, the one or more other matching fields are one or more other required matching fields, the first user-specified rule also specifies one or more preferred fields, and the second user-specified rule also specifies one or more other preferred fields;
> wherein identifying the second record further comprises:
>> assigning a first score to the second record based at least in part on whether the second record matches the one or more preferred fields, and selecting the second record from among a plurality of records of the first set of data based at least in part on the first score;
> wherein identifying the third record further comprises:
>> assigning a second score to the third record based at least in part on whether the third record matches the one or more other preferred fields, and selecting the third record from among a plurality of records of the first set of data based at least in part on the second score.

13. The computer-program product of claim 11, wherein the first user-specified rule indicates that updates are to be automatically applied and the second user-specified rule indicates that updates are to be reviewed before being applied, wherein updating the fourth record and updating the first record are configured to be performed automatically in response to identifying the fourth record for use as the first candidate connection from the first record to the second set of data, without prompting a user for confirmation before updating the fourth record and updating the first record.

14. The computer-program product of claim 11, wherein the one or more updates are received from a first user, wherein the first user-specified rule indicates that updates are to be reviewed before being applied and the second user-specified rule indicates that updates are to be automatically applied, wherein updating the fourth record and updating the first record are configured to be performed after notifying a second user, according to the first user-specified rule, that the fourth record is proposed for use as the first candidate connection from the first record to the second set of data, and wherein updating the fourth record and updating the first record are configured to be performed in response to receiving user input from the second user confirming the fourth record is to be used as the first candidate connection from the first record to the second set of data.

15. The computer-program product of claim 11, wherein the one or more updates are received from a first user, wherein the first user-specified rule indicates that updates are to be reviewed by a second user before being applied and the second user-specified rule indicates that updates are to be reviewed by a third user before being applied, wherein updating the fourth record and updating the first record are configured to be performed after notifying the second user, according to the first user-specified rule, that the fourth record is proposed for use as the first candidate connection from the first record to the second set of data, and wherein updating the fourth record and updating the first record are configured to be performed in response to receiving user input from the second user confirming the fourth record is to be used as the first candidate connection from the first record to the second set of data; wherein updating the fifth record is configured to be performed after notifying the third user, according to the second user-specified rule, that the fifth record is proposed for use as the second candidate connection from the first record to the third set of data, and wherein updating the fifth record is configured to be performed in response to receiving user input from the third user confirming the fifth record is to be used as the second candidate connection from the first record to the third set of data.

16. A system comprising:
> one or more processors;
> one or more non-transitory computer-readable media storing instructions, which, when executed by the system, cause the system to perform a set of actions including:
>> receiving one or more updates to one or more records of a first set of data stored in one or more first database structures, wherein one or more other records of the first set of data reference one or more key values of a second set of data stored in one or more second database structures and one or more key values of a third set of data stored in one or more third database structures;
>> for at least a first record, of the one or more records, identifiable in the first set of data using a first key value, identifying candidate connections from the first record to the second set of data and the third set of data at least in part by:
>>> accessing a first user-specified rule for connecting the first set of data to the second set of data, wherein the first user-specified rule comprises one or more matching fields of the first set of data;
>>> identifying a second record in the first set of data that:
>>>> satisfies an ancestor condition at least in part by sharing a common ancestor with the first record, and
>>>> matches the first record on the one or more matching fields;
>>> wherein the second record references a second key value of the second set of data;
>>> accessing a second user-specified rule for connecting the first set of data to the third set of data, wherein the second user-specified rule specifies one or more other matching fields of the first set of data;
>>> identifying a third record in the first set of data that:
>>>> satisfies an ancestor condition at least in part by sharing a common ancestor with the first record, and
>>>> matches the first record on the one or more other matching fields;
>>> wherein the third record references a third key value of the third set of data;
>>> identifying, for use as a first candidate connection from the first record to the second set of data, a fourth record in the second set of data using the second key value; and
>>> identifying, for use as a second candidate connection from the first record to the third set of data, a fifth record in the third set of data using the third key value;
>> updating the fourth record to reference the first record using the first key value;
>> updating the fifth record to reference the first record using the first key value;
>> updating the first record in the first set of data to reference the fourth record using the second key value and the fifth record using the third key value;
>> receiving a request from an application for information from the fourth record, and, in response to the request, providing information about the first record.

17. The system of claim 16, wherein the one or more matching fields are one or more required matching fields, the one or more other matching fields are one or more other required matching fields, the first user-specified rule also specifies one or more preferred fields, and the second user-specified rule also specifies one or more other preferred fields;

wherein identifying the second record further comprises:
assigning a first score to the second record based at least in part on whether the second record matches the one or more preferred fields, and selecting the second record from among a plurality of records of the first set of data based at least in part on the first score;
wherein identifying the third record further comprises:
assigning a second score to the third record based at least in part on whether the third record matches the one or more other preferred fields, and selecting the third record from among a plurality of records of the first set of data based at least in part on the second score.

18. The system of claim 16, wherein the first user-specified rule indicates that updates are to be automatically applied and the second user-specified rule indicates that updates are to be reviewed before being applied, wherein updating the fourth record and updating the first record are configured to be performed automatically in response to identifying the fourth record for use as the first candidate connection from the first record to the second set of data, without prompting a user for confirmation before updating the fourth record and updating the first record.

19. The system of claim 16, wherein the one or more updates are received from a first user, wherein the first user-specified rule indicates that updates are to be reviewed before being applied and the second user-specified rule indicates that updates are to be automatically applied, wherein updating the fourth record and updating the first record are configured to be performed after notifying a second user, according to the first user-specified rule, that the fourth record is proposed for use as the first candidate connection from the first record to the second set of data, and wherein updating the fourth record and updating the first record are configured to be performed in response to receiving user input from the second user confirming the fourth record is to be used as the first candidate connection from the first record to the second set of data.

20. The system of claim 16, wherein the one or more updates are received from a first user, wherein the first user-specified rule indicates that updates are to be reviewed by a second user before being applied and the second user-specified rule indicates that updates are to be reviewed by a third user before being applied, wherein updating the fourth record and updating the first record are configured to be performed after notifying the second user, according to the first user-specified rule, that the fourth record is proposed for use as the first candidate connection from the first record to the second set of data, and wherein updating the fourth record and updating the first record are configured to be performed in response to receiving user input from the second user confirming the fourth record is to be used as the first candidate connection from the first record to the second set of data; wherein updating the fifth record is configured to be performed after notifying the third user, according to the second user-specified rule, that the fifth record is proposed for use as the second candidate connection from the first record to the third set of data, and wherein updating the fifth record is configured to be performed in response to receiving user input from the third user confirming the fifth record is to be used as the second candidate connection from the first record to the third set of data.

* * * * *